US011782588B1

(12) United States Patent
Bachmann

(10) Patent No.: US 11,782,588 B1
(45) Date of Patent: Oct. 10, 2023

(54) METHOD AND SYSTEM FOR DISPLAYING A RESOURCE LAYER AND A NEED LAYER OVER A SELECTED GEOGRAPHICAL AREA

(71) Applicant: Cook Children's Health Care System, Fort Worth, TX (US)

(72) Inventor: Michael Bachmann, Fort Worth, TX (US)

(73) Assignee: COOK CHILDREN'S HEALTH CARE SYSTEM, Fort Worth, TX (US)

( * ) Notice: Subject to any disclaimer, the term of this patent is extended or adjusted under 35 U.S.C. 154(b) by 206 days.

(21) Appl. No.: 17/014,829

(22) Filed: Sep. 8, 2020

Related U.S. Application Data

(60) Provisional application No. 62/897,828, filed on Sep. 9, 2019.

(51) Int. Cl.
| | |
|---|---|
| *G06F 3/04847* | (2022.01) |
| *G01W 1/00* | (2006.01) |
| *G06F 16/29* | (2019.01) |
| *G06T 17/05* | (2011.01) |
| *G06F 3/0481* | (2022.01) |

(52) U.S. Cl.
CPC .......... *G06F 3/04847* (2013.01); *G01W 1/00* (2013.01); *G06F 3/0481* (2013.01); *G06F 16/29* (2019.01); *G06T 17/05* (2013.01)

(58) Field of Classification Search
None
See application file for complete search history.

(56) References Cited

U.S. PATENT DOCUMENTS

| | | | | |
|---|---|---|---|---|
| 6,339,745 | B1 * | 1/2002 | Novik | G08G 1/123 |
| | | | | 701/484 |
| 9,436,949 | B1 * | 9/2016 | Samin | G06Q 40/06 |
| 10,275,912 | B1 * | 4/2019 | Hamilton | G06F 16/29 |
| 10,679,157 | B2 * | 6/2020 | Mitchell | G07C 5/02 |
| 10,739,975 | B2 * | 8/2020 | Chen | G06T 11/001 |

(Continued)

OTHER PUBLICATIONS

Daley et al., Risk Terrain Modeling Predicts Child Maltreatment, Child Abuse & Neglect, vol. 62, pp. 29-38, Dec. 2016, Elsevier Ltd., Amsterdam, The Netherlands.

*Primary Examiner* — Haimei Jiang
(74) *Attorney, Agent, or Firm* — HAYNES AND BOONE, LLP

(57) ABSTRACT

A method includes displaying, on a GUI, a graphical representation of a geographical area sectioned into a plurality of subareas defined by boundaries; displaying, over the graphical representation, a resource need layer that visually depicts a first parameter associated with a need of a resource within a subarea, the depiction of the first parameter varying within the subarea; and displaying, over the graphical representation, a resource availability layer that visually depicts a second parameter indicating the availability of the resource within the subarea, the depiction of the second parameter varying within the subarea; wherein the layers are displayed simultaneously over the graphical representation to provide a visual comparison of the need of the resource and the availability of the resource within the subarea. In some embodiments, the need is based on data including one or more of demographic data from a census, other data from the census, and crime data.

19 Claims, 24 Drawing Sheets

(56) References Cited

U.S. PATENT DOCUMENTS

| | | | | |
|---|---|---|---|---|
| 11,030,560 | B1* | 6/2021 | Brandt | G08G 1/202 |
| 2003/0115211 | A1* | 6/2003 | Chen | G06F 16/29 |
| | | | | 707/999.102 |
| 2009/0198641 | A1* | 8/2009 | Tortoriello | G06N 7/02 |
| | | | | 706/52 |
| 2009/0319931 | A1* | 12/2009 | Hutchings | G06F 3/0481 |
| | | | | 715/764 |
| 2010/0094548 | A1* | 4/2010 | Tadman | G06F 16/29 |
| | | | | 715/810 |
| 2013/0321407 | A1* | 12/2013 | Jenkins | G06F 16/29 |
| | | | | 707/706 |
| 2014/0046983 | A1* | 2/2014 | Galloway | G06F 16/248 |
| | | | | 707/798 |
| 2015/0095355 | A1* | 4/2015 | Patton | H04W 4/021 |
| | | | | 707/754 |
| 2015/0112647 | A1* | 4/2015 | Currin | H04L 67/10 |
| | | | | 703/1 |
| 2016/0258775 | A1* | 9/2016 | Santilli | G01C 21/3676 |
| 2016/0307047 | A1* | 10/2016 | Krishnamoorthy | |
| | | | | G06Q 30/0185 |
| 2017/0034196 | A1* | 2/2017 | Chauhan | G06F 21/577 |
| 2017/0177619 | A1* | 6/2017 | Georgiev | G06F 16/29 |
| 2017/0308549 | A1* | 10/2017 | Sims | G06Q 50/167 |
| 2018/0040088 | A1* | 2/2018 | Kanada | G06Q 10/103 |
| 2018/0173410 | A1* | 6/2018 | Chen | G01C 21/3682 |
| 2018/0218057 | A1* | 8/2018 | Beckham | A01K 29/005 |
| 2018/0350144 | A1* | 12/2018 | Rathod | G06Q 20/3224 |
| 2019/0066241 | A1* | 2/2019 | Budlong | G06F 16/29 |
| 2019/0324981 | A1* | 10/2019 | Counts | G06F 40/216 |
| 2019/0325642 | A1* | 10/2019 | Martinet | G06F 16/9024 |
| 2021/0334733 | A1* | 10/2021 | Peters | G06F 16/287 |

* cited by examiner

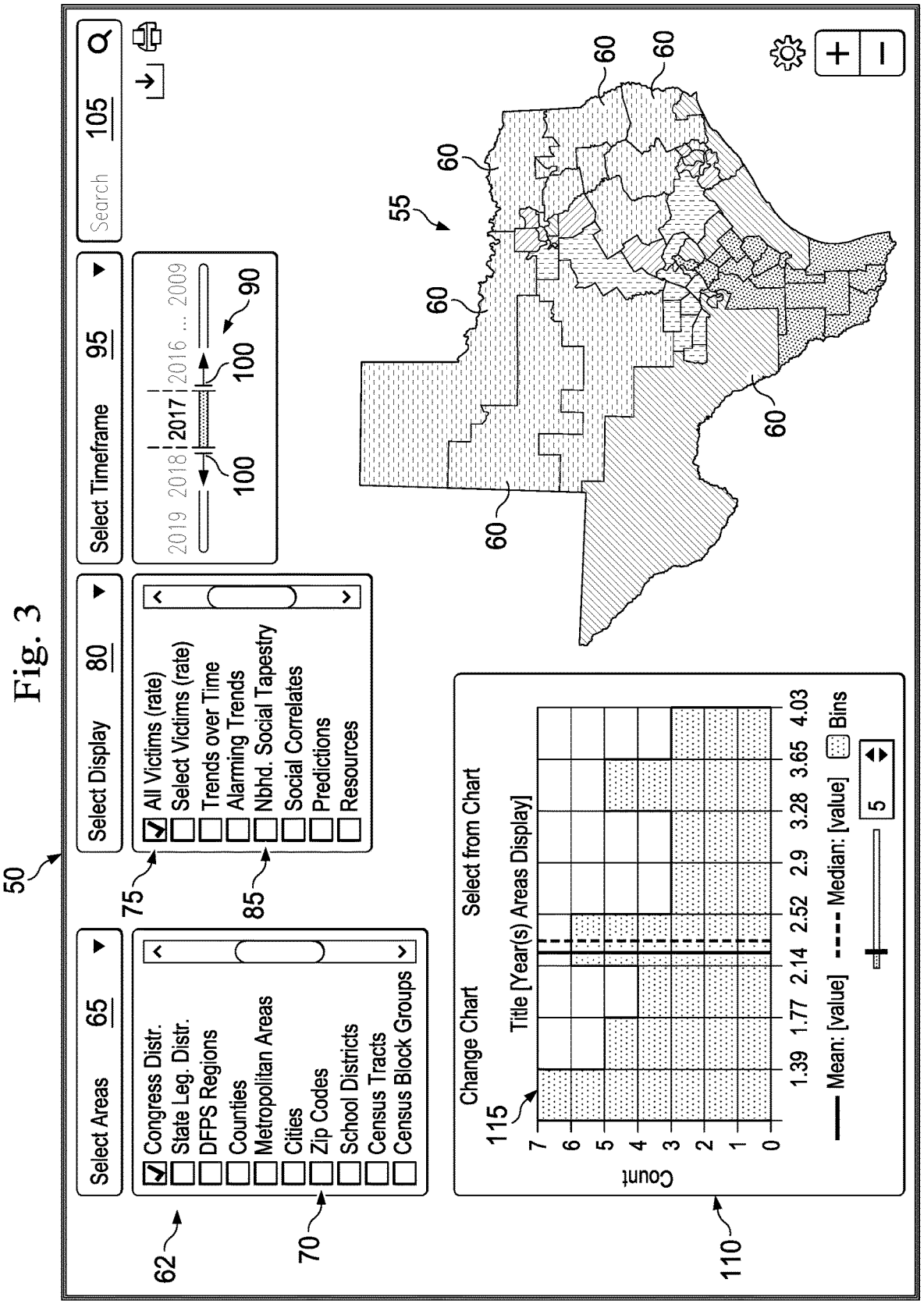

US 11,782,588 B1

METHOD AND SYSTEM FOR DISPLAYING A RESOURCE LAYER AND A NEED LAYER OVER A SELECTED GEOGRAPHICAL AREA

CROSS-REFERENCE TO RELATED APPLICATION

This application claims the benefit of the filing date of, and priority to, U.S. Application No. 62/897,828, filed Sep. 9, 2019, the entire disclosure of which is hereby incorporated herein by reference.

TECHNICAL FIELD

The present disclosure relates generally to devices and methods for generating and displaying, on a graphical user interface and over a representation of a geographical area, a layer that represents a need of a resource within the geographical area and a layer that represents resources available to address the need within the geographical area.

BACKGROUND

Prevention efforts associated with an event or condition are often specific to a geographical location and/or are effective based on their geographical location. As such, the geographical location of a prevention effort is often critical to its success. Modeling, such as Risk Terrain Modeling, can be used to predict the best geographical location and/or the best type of prevention effort for a geographical location, but conventional modeling often uses a very limited number of only crime-based, address-specific predictors. As such, prevention efforts relying on these conventional models are either misplaced or not the most efficient use of prevention efforts.

BRIEF DESCRIPTION OF THE DRAWINGS

FIG. 3 is an illustration of a window displayed on the GUI of FIG. 1, according to an example embodiment.

DETAILED DESCRIPTION

Figure 1:
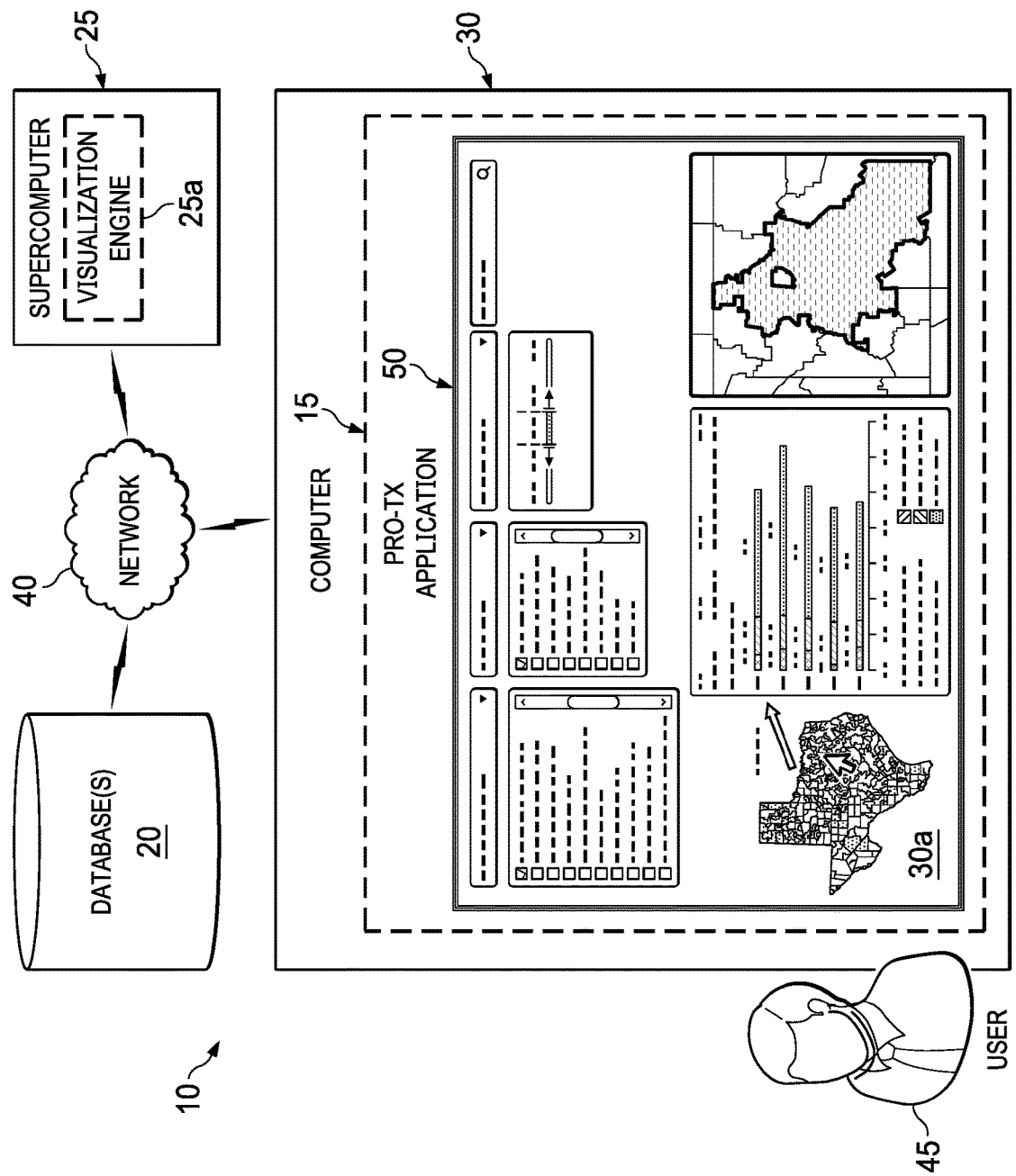
FIG. 1 is a diagrammatic illustration of a system that includes database(s), a computer having a graphical user interface ("GUI") that is configured to display a plurality of windows, an application, and a supercomputer, according to an example embodiment.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In an example embodiment, referring to FIG. 1, a system 10 includes an analytical/decision-support/dashboard, or PRO-TX, application 15; database(s) 20; a supercomputer 25 that includes a visualization engine 25a; and a computer 30 on which a graphical user interface ("GUI") 30a is displayed. The database(s) 20, the supercomputer 25, and the computer 30 are operably connected via a network 40. Generally, the PRO-TX application 15 is configured to present a window 50 on the GUI 30a of the computer 30 to a user 45 of the computer 30.

In one embodiment, the system 10 is an advanced, machine-learning enabled analytical platform that, using the application 15 and the GUI 30a, aids in prevention, treatment, and future identification efforts relating to an event or condition ("EC") within a geographical area. In some embodiments, a variety of factors are associated with the EC. For example, when the EC is an opioid-use disorder and/or overdose, the factors associated with a location with above-average incidents of opioid overdoses, Narcan administration, and/or arrest for narcotics-related offenses include neighborhood-level data such as: average income, gender ratios, insured statuses (e.g., private insurance, Medicaid), per capita prescriptions for opioids, past or currently problematic areas for substance abuse, past opioid overdose events, untreated psychiatric disorders at the community level, average age of residents, geographical location and environmental considerations, social environment that encourages misuse, family environment that encourages misuse, neighborhood environment that encourages misuse, etc. Some factors are not readily apparent, and the system 10 aids in the prevention, treatment, and future identification efforts relating to an EC within a geographical area by identifying new factors that relate to the EC within the geographical area. That is, the identification of new factors by the system 10 improves the treatment, prevention, and diagnosis of the EC.

In some embodiments, the system 10 identifies a place of interest ("POI"), which is a place associated with the EC. In some embodiments, the POI is the residence location of a patient with a specific diagnosed medical condition, such as asthma, diabetes, high blood pressure, etc. However, in other embodiments the POI is the incident or residence locations of a victim of a crime and/or a perpetrator of a crime. In other embodiments, the POI is the residence location of a patient that experienced a past event, such as an opioid overdose and/or a residence location of a patient that is at risk for a future opioid overdose. Thus, and in some embodiments, the system 10 aids in the prevention, treatment, and future identification efforts relating to an EC within a geographical area by identifying past or existing POIs and/or predicting future POIs or at least a future location of a POI or EC.

Prevention efforts relating to the EC are often tailored to a geographical location. For example, community outreach is often tailored based on the location of the outreach, intended audience, place or POIs targeted. Thus, and in some embodiments, the system 10 aids in the prevention, treatment, and future identification efforts relating to an EC within a geographical area by identifying the most effective location of a future prevention effort.

When evaluating prevention efforts, the effectiveness of any existing community outreach efforts is evaluated. Thus, and in some embodiments, the system 10 aids in the prevention, treatment, and future identification efforts relating to an EC within a geographical area by evaluating the existing community outreach or by identifying any correlation between a reduction in ECs and prevention efforts.

Responses to events at places potentially associated with the EC are also tailored based on geographical location. For example, medics that service a geographical location with a high density of opioid overdoses may carry medication to address a potential opioid overdose or an increased amount of said medication while medics that service a geographical location with very little or no opioid overdoses may not carry or carry less of said medication. Thus, and in some embodiments, the system 10 can be used to tailor responses to events at POIs or other places potentially associated with the EC.

In some embodiments, the factors associated with the EC are depicted as a layer that is displayed over a geographical representation of area(s) via the supercomputer 25 and the PRO-TX application 15 to aid in the prevention, treatment, and diagnosis efforts of the EC based on geographical location. As such, the PRO-TX application 15 and the supercomputer 25 together form a scalable, rapid-turnaround information system to assist a wide range of audiences.

In one embodiment, the PRO-TX application 15 includes and/or executes one or more web-based programs, Intranet-based programs, and/or any combination thereof. In an example embodiment, the PRO-TX application 15 includes a computer program including a plurality of instructions, data, and/or any combination thereof. In an example embodiment, the PRO-TX application 15 is written in, for example, HyperText Markup Language (HTML), Cascading Style Sheets (CSS), JavaScript, Extensible Markup Language (XML), asynchronous JavaScript and XML (Ajax), and/or any combination thereof. In an example embodiment, the PRO-TX application 15 is a web-based application written in, for example, Java or Adobe Flex, which pulls real-time information from another computer such as the supercomputer 25 and/or a plurality of data sources such as the database(s) 20. In an example embodiment, the PRO-TX application 15 pulls real-time information from the supercomputer 25, upon the execution, opening or start-up of the PRO-TX application 15. In an example embodiment, one portion of the PRO-TX application 15 is stored on the cloud or an application server remote from the computer 30 and the supercomputer 25, but another portion of the PRO-TX application 15 is stored in the computer 30.

In one embodiment, the database(s) 20 is or includes a government database or other database. For example, the database(s) 20 may include any one or more of databases regarding or maintained by: The United States Census Bureau; National 911 Profile Database; Healthcare Cost and Utilization Project ("HCUP") Nationwide Emergency Department Database; Prescription Drug Monitoring Program; Access to Archival Databases ("AAD"); Agricola ("USDA"); American FactFinder; Bureau of Economic Analysis; Catalog of Federal Domestic Assistance; Catalog of U.S. Government Publications; Central Intelligence Agency World Factbook; Child Welfare Information Gateway; Disaster Airlift Response Teams ("DARTS") Pilot National Technical Information Service; Education Information Resource Center ("ERIC") Department of Education; Education Reports from ERIC ("GPO"); Energy Citations Database; U.S. Government Accountability Office Reports; U.S. Government Printing Office Access; Homeland Security Digital Collection; Housing and Urban Development Data at HUD USER; Information Bridge; National Security Archive; North American Industry Classification System; Military Periodicals Index; Substance Abuse and Mental Health Data Archive; National Aeronautics and Space Administration ("NASA") Technical Reports Server; NASA Image Exchange; National Technical Information Service Index; PubMed; Public Scientific & Technical Information Network; National Environmental Publications Information System; National Environmental Satellite Data Information Services; Science Cinema; U.S. National Library of Medicine TOXNET; TRIS Online; USGS Publications Warehouse; USAID Development Experience Clearinghouse; United Nations Treaty Collection; USASpending; and U.S. Patent Databases. In some embodiments, the database(s) 20 include publicly accessible databases and/or secure databases that are not available to the public. Some of the secure databases that are not available to the public include databases maintained or created by governmental agencies or departments servicing the public. For example, the database(s) 20 may include databases maintained or created by a state affordable housing agency or department, state department of criminal justice, education agency, animal health and/or control commission, natural resource such as water commission, department of motor vehicles, probation and parole departments, department relating to infectious disease, health and human services commission, family and protective services, etc.

In one embodiment, the supercomputer 25 is an industrial computing system, such as a computing system known as "Frontera"; "Stampede2", "Lonestar"; "Wrangler"; "Hikari"; and/or "Jetstream", all of which are located at, or associated with, the University of Texas at Austin. In some embodiments, the supercomputer 25 is a computer owned or managed by the Texas Advanced Computing Center ("TACC") at the University of Texas at Austin. In some embodiments, the supercomputer 25 includes the visualization engine 25a, which is accessible via a portal that allows for remote, interactive, web-based visualizations. In some embodiments, the visualization engine 25a is or includes any one or more of visualization systems/services known as "Maverick"; "Stallion"; "Lasso"; "Visualization Laboratory"; and "Scientific Visualization Gallery" located at or offered by University of Texas at Austin. In some embodiments, the supercomputer 25 includes any one or more of the following features: iPython/Jupyter Notebook integration; R Studio integration; Run on Stampede2 and Wrangler; visualization job submission and monitoring; and current resource usage and allocation view. Regarding Stampede2, in some embodiments Stampede2 uses SkyLake ("SKX") and Knights Landing ("KNL") processors from Intel of Santa Clara, Calif. for all visualization and rendering operations. Regarding Hikari, in some embodiments Hikari uses Haswell Xeon processors from Intel of Santa Clara, Calif. for all visualization and rendering operations. In some embodiments, an Intel OpenSWR library from Intel of Santa Clara, Calif. is used to render raster graphics with OpenGL, and the Intel OSPRay framework from Intel of Santa Clara, Calif. is used for ray traced images inside visualization software. In some embodiments and regarding Stampede2, "swr" replaces "vglrun" (e.g. "swr glxgears") and uses similar syntax. In some embodiments, OpenSWR can be loaded by executing "module load swr". In some embodiments, all visualization apps are available on all nodes. In some embodiments, Virtual Network Computing ("VNC") and Distributive Numerical Control ("DCV") sessions are available on any queue, either through the command line or via a TACC Visualization Portal. In some embodiments, a remote desktop access is available with the supercomputer 25. Generally, the PRO-TX application 15 interacts with the supercomputer 25 to provide, to the computer 30, remote desktop access to the supercomputer 25. In some embodiments, remote desktop access to Stampede2 is formed through a VNC connection to one or more visualization nodes. Generally, a connection is created to a Stampede2 login node and a special interactive batch job is submitted that: allocates a set of Stampede2 visualization nodes; starts a vncserver process on the first allocated node; and sets up a tunnel through the login node to the vncserver access port. In some embodiments, connections and remote desktop access is available to Hikari in a manner similar to the manner associated with Stampede2. Once the vncserver process is running on the visualization node and a tunnel through the login node is created, an output message identifies the access port for connecting a VNC viewer. A VNC viewer application is run on the computer 30 and presents the window 50 to the user 45.

Figure 2:
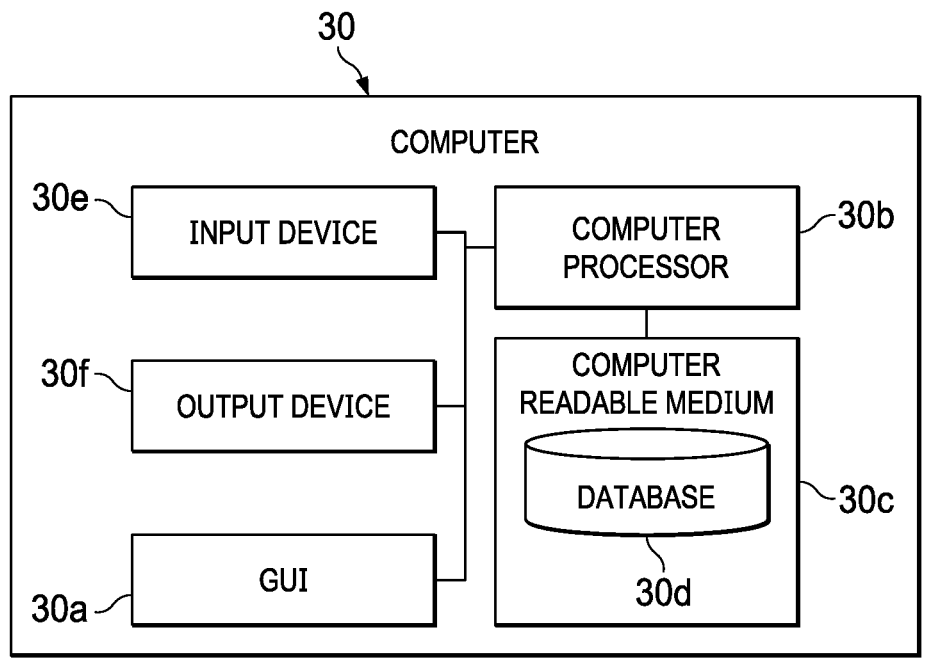
FIG. 2 is a diagrammatic illustration of the computer of FIG. 1, according to an example embodiment.

In an example embodiment, as illustrated in FIG. 2 with continuing reference to FIG. 1, the computer 30 includes the GUI 30a, a computer processor 30b, and a computer readable medium 30c operably coupled thereto. Instructions accessible to, and executable by, the computer processor 30b are stored on the computer readable medium 30c. A database 30d is also stored in the computer readable medium 30c. Generally, the GUI 30a is capable of displaying a plurality of windows or screens, such as the window 50, to the user 45. The computer 30 also includes an input device 30e and an output device 30f. In some embodiments, the input device 30e and the output device 30f are the GUI 30a. In some embodiments, the GUI 30a is configured to display a plurality of windows or screens, such as the window 50, and the user 45 provides inputs to the system 10 via the window 50 or another window/screen that is displayed on the GUI 30a.

In an example embodiment, the network 40 includes the Internet, one or more local area networks, one or more wide area networks, one or more cellular networks, one or more wireless networks, one or more voice networks, one or more data networks, one or more communication systems, and/or any combination thereof.

In some embodiments, the window 50 is displayed on the GUI 30a via the application 15 and using the visualization engine 25a. In some embodiments and as illustrated in FIG. 3, the window 50 includes a map 55 or other graphical representation of a geographical area. As illustrated, the map 55 is of the State of Texas, but the geographical area may include any state or other geographical area that is not a state.

In one embodiment and as illustrated in FIG. 3, the geographical area comprises a plurality of subareas 60 having different geographical boundaries. For example, when the geographical area is a state, the subareas 60 are sectioned into congressional districts, state legislative districts, municipal areas, educational districts, government agency regions, counties, metropolitan areas, cities, zip codes, school districts, census tracts, census block groups, etc. A listing of boundary identifiers 62 is viewable via a drop-down menu labeled "Select Areas" 65. Selectable buttons 70 are associated with the listing of the boundary identifiers 62, with one button associated with each of the boundary identifiers 62. The selection of one boundary identifier from the listing of boundary identifiers 62 defines the boundaries for the system 10. That is, in one embodiment the selection of one boundary identifier from the listing of boundary identifiers 62 is the boundary input provided to the system 10 and is used for the aggregation and analysis of data.

In some embodiments, the window 50 also includes display parameters 75 that are viewable via a drop-down menu labeled "Select Display" 80. Selectable buttons 85 are associated with the display parameters 75, with one button associated with each display parameter. In some embodiments, the display parameters 75 include All Victims; Select Victims; Trends over Time; Alarming Trends; Neighborhood Social Tapestry; Social Correlates; Predictions; and Resources among others. In some embodiments, the display parameters relate to a group or subgroup of interest, such as for example the All Victims and Select Victims. However, other display parameters 75 relate to details on the relationships between groups such as victims and offenders, for example when the offender is the parent or other family member of the victim. For example, one display parameter 75 may relate to an education level of a parent of a victim, etc. In some embodiments, the selection of one of the display parameters 75 instructs the system 10 as to what data is to be displayed over a selected geographical area or subarea. In some embodiments, the display parameters identify factors that are to be identified, analyzed, and displayed over the geographical area via the window 50. In some embodiments and as noted above, a factor can include a variety of data points. In some instances, the factor is an EC event (confirmed diagnosis or event, a reporting of a suspected event, etc.), while in other instances the factor relates to average education levels of residents who live within the geographical area. In some embodiments, the geographical area in its entirety is considered selected unless the system 10 receives an indication that the user 45 has selected one subarea of the geographical area. Thus, and as illustrated in FIG. 3, the State of Texas is the selected geographical area until the system 10 receives an indication that one subsection of Texas is the selected geographical area.

In some embodiments, the window 50 also includes a selectable timeframe 90 that is viewable via a drop-down menu labeled "Select Timeframe" 95. One or more sliders 100 or other type of input control button/element is displayed and movable to provide inputs regarding a desired timeframe. In some embodiments, an input control button/element includes any one of a slider, radio button, text entry element, drop-down menu, etc.

In some embodiments, the window 50 also includes an input element 105 such as a text box that receives input related to a search or query.

In some embodiments, the window 50 also includes a sub-window 110 that includes a chart 115 or other graphical display.

Figure 4:
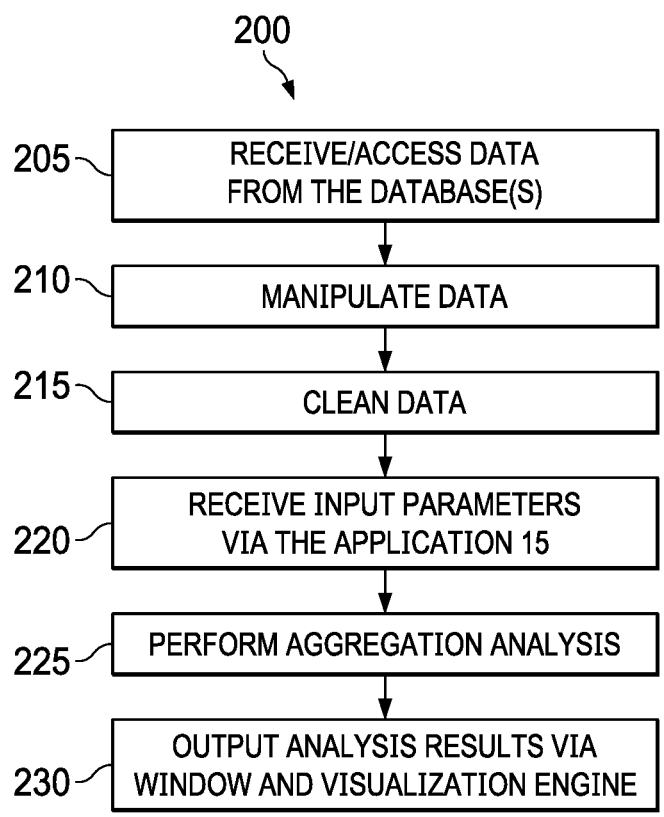
FIG. 4 is a flow chart illustration of a method of operating the system of FIGS. 1-3, according to an example embodiment.

In an example embodiment, as illustrated in FIG. 4 with continuing reference to FIGS. 1-3, a method 200 of operating the system 10 includes receiving and/or accessing data from the database(s) 20 at step 205; manipulating the data at step 210; cleaning the data at step 215; receiving input parameters via the application 15 at step 220; performing an aggregation analysis at step 225; and outputting the analysis results via the window 50 and the visualization engine 25*a* at step 230.

In one embodiment and at step 205, the data is received and/or accessed from the database(s) 20. In some embodiments, the step 205 includes running R scripts that form a portion of the application 15 to instruct the supercomputer 25 as to which data is to be accessed and/or received from the database(s) 20. However, other types of instructions can be included or used with the application 15 to instruct the supercomputer 25 as to which data is to be accessed and/or received from the database(s) 20. In some embodiments, a portion of the data is accessed or received once, periodically, in response to an update in the data, and/or in real-time. For example, and when the EC is an opioid-use disorder and/or overdose, data relating to places and groups within different geographic locations are downloaded or accessed from the United States Census Bureau. For example, the application 15 may instruct the supercomputer 25 to access aggregated data relating to: basic count of people; age; sex; age group; disability status or other details; education status; employment status; income; earnings; insurance coverage status; language; marital status; fertility status; origin; population change; poverty status; relationship status; and/or veteran status from the United States Census Bureau. In some embodiments, data also includes aggregated data relating to 911 calls, such as frequency, call reason, etc., and data relating to crime statistics. In some embodiments, data relating to the geography is accessed and/or received by the supercomputer 25. In some embodiments, boundaries are man-made boundaries such as for example boundaries for zip codes, area codes, political boundaries, district zones, city limits, etc. In some embodiments, boundaries are physical or natural boundaries such as rivers, mountain ranges, lakes, oceans, deserts, etc. In some embodiments, data relating to a parcel map is accessed and/or received such that an overlay of addresses, subdivisions, streets, etc. can be associated with a geographical area and displayed over a geographical representation of the geographical area. Additional data can be accessed specifically regarding the EC, such as treatment for the condition/event. In some embodiments and when the EC is an opioid-use disorder and/or overdose, data relating to locations with above-average emergency room treatment rates from the HCUP Nationwide Emergency Department Database and/or data relating to specific drugs being prescribed and dispensed from the Prescription Drug Monitoring Program is accessed and/or received by the supercomputer 25. Any variety of data can be accessed and/or received by the supercomputer 25 for a variety of ECs. In some embodiments, the window 50 provides an input mechanism configured to receive, or point to, data stored on the computer 30. In some embodiments, the input mechanism identifies a file of data to be accessed by the system 10. Generally, the user 45 provides a link or other instructions in the input mechanism so that the system 10 receives, or is pointed to, the data stored on the computer 45. In other embodiments, the window 50 provides an input mechanism configured to point to data that is not stored in the computer 30 but that has been identified by the user 45 as relevant. As such, the user 45 can provide data to the system 10 via the computer 30.

In one embodiment and at step 210, the data is manipulated. In some embodiments, the step 210 includes running R scripts that recode the data such that the data is aggregated over geographical areas, such as independent school districts or metroplexes. For example, and in some embodiments, the data accessed and/or received from the United States Census Bureau is associated with a specific census tract, census area, or census block, which is generally the smallest territorial entity for which population data is available. In some embodiments, the data accessed is associated with polygons defined by boundary files. In some embodiments, the data accessed is accessed or received in a format such that data associated with a specific geographical location that is encompassed within a polygon is generically associated with the polygon and not to the specific geographical location that is encompassed within the polygon. In some embodiments, the application 15 and the supercomputer 25 recode the data associated with each census block such that the data is capable of being analyzed and aggregated across boundaries associated with the census blocks. In some embodiments, the data from the database(s) 20 is manipulated such that vector or polygon information for an area with a larger boundary is calculated based on a number of entailed, smaller boundaries for which data exists.

In one embodiment and at step 215, the data is cleaned. In some embodiments, cleaning the data using the system 10 includes determining whether there are multiple or duplicate data entries regarding an EC, determining whether an address is valid, etc.

Figure 5:
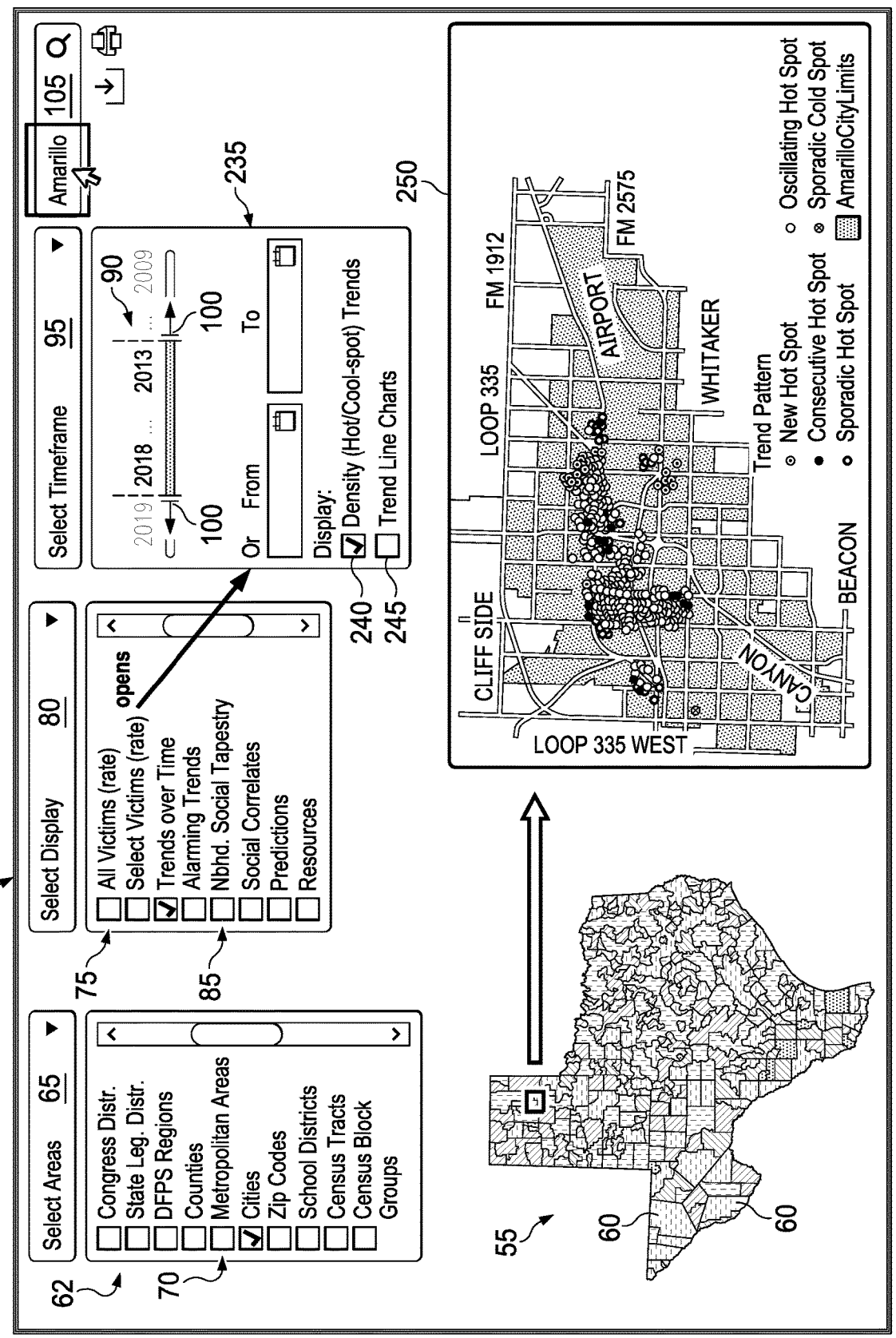
FIGS. 5-17 are illustrations of the window of FIG. 3 before, during, or after execution of step(s) of the method of FIG. 4, according to several example embodiments.

In one embodiment and at step 220, the input parameters are received. In some embodiments, the input parameters include a selected boundary identifier, a timeframe, a location, and/or a selected display parameter. In some embodiments, the input parameters are received via the window 50 using the buttons 70, 85, and sliders 100. However, in other embodiments, input parameters include text inserted in the input element 105, selection of a portion of the chart 115, selection of a portion of the map 55, and/or a selection of any combination thereof. In some embodiments and as illustrated in FIG. 5, the input parameters received include "Cities" via one of the buttons 70 and the "Trends over Time" via one the buttons 85. As illustrated, the selection of the "Trends over Time" via one of the buttons 85 opens a pop-up window 235 that is designed to receive timeline parameters via the sliders 100 and/or a selection of "Density (Hot/Cool-spot) Trends" via a button 240 or "Trend Line Charts" via a button 245. The input parameters received also include the city of "Amarillo" in the input element 105.

In one embodiment and at step 225, an aggregation analysis is performed. In some embodiments, the aggregation analysis is performed by the supercomputer 25. In some embodiments and during the step 225, the supercomputer 25 aggregates dependent variables to boundaries and performs a trend analysis via such as for example Getis-Ord Gi*, Mann-Kendall Trend Test, among other activities. In one embodiment, factors identified by the selected display parameter are associated within one cell from a plurality of cells or one bin from a plurality of bins that extend along an X axis and a Y axis. In one embodiment, an R script uses the time variable selected via the sliders 100 to sort data into time cells or bins that run along a Z axis. A Getis-Ord Gi* analysis script identifies cluster of significant concentrations within each time bin and a Mann-Kendall trend test or analysis script looks through time from top to bottom (along the Z axis) of time bin stacks to examine density patterns over time. As such, the application and/or the supercomputer 25 identifies trend patterns. However, and in some embodiments, the system 10 uses other types of analyses to determine or identify trend patterns.

In one embodiment and at step 230, the application 15 outputs or displays the analysis results via the window 50. For example, and as illustrated in FIG. 5, trend patterns are illustrated as a 2D representation with different icons representing different significant trends over time. In some embodiments and as illustrated in FIG. 5, when the application 15 receives input parameters including the "Density (Hot/Cool-spot) Trends" parameter via the button 240, the window 50 displays the map 55 with 2D representations of different significant trends over time. If the user wants to view a specific area in greater detail, then the user can enter a search parameter in the input element 105 and a pop-up window 250 providing additional details is displayed and the map 55 zooms to the searched area. For example, the different trends over time may include "New Hot Spot"; "Consecutive Hot Spot"; Sporadic Hot Spot": "Oscillating Hot Spot"; and "Sporadic Cold Spot." As illustrated in FIG. 5, an enlarged map of the city of Amarillo is displayed via the window 250 and the factors or parameters identified via the selected display parameter are overlaid over the enlarged map of the city of Amarillo. Specifically, the factors displayed include location identifiers in which a hot or cold spot has been identified. For example, sporadic hot spots have been identified as being located along Airport road, while new hot spots have been identified as being located just to the left of those sporadic hot spots. As illustrated, the factors or parameters that are displayed vary across the selected subarea (i.e., Amarillo). For example, indicators of a density trend are grouped together in the middle of the geographical representation of Amarillo that is displayed in the window 250 while there are few or no indicators of a density trend on the perimeter of the geographical representation of Amarillo displayed on the window 250. As such, the parameters or indicators vary across the selected subarea. In some embodiments, the distribution of the parameter or indicator across the selected subarea is not uniform and thus varies across the selected subarea, which is Amarillo in this example.

Figure 6:
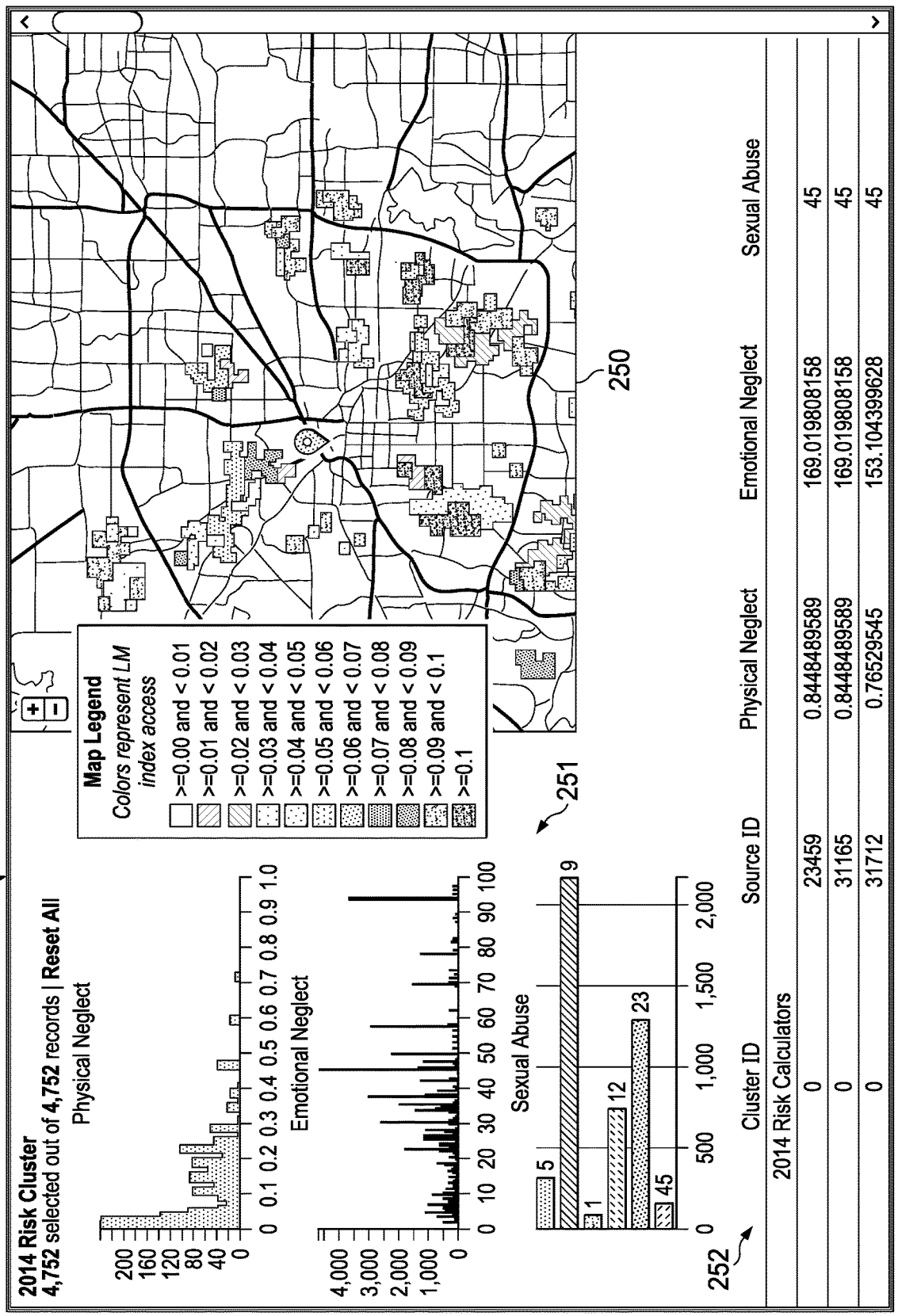

Another example of the window 50 displaying density trends is illustrated in FIG. 6. As illustrated in FIG. 6, cluster information is displayed in the window 50. In some embodiments, a cluster is similar or identical to a hot spot. In some embodiments, a cluster is associated with a high instance of cluster factor(s) within a geographical area. Generally, each cluster factor is an input parameter received by the user 45. Cluster information may also include cluster factor data. For example, cluster factor(s) may include physical neglect, emotional neglect, and sexual abuse. Cluster factor data may be the number of instances or other numerical data relating to a cluster factor. The system 10 identifies the location of instances associated with each cluster factor and determines, due to the proximity to other instances, if a cluster is present. As illustrated, a map is displayed in the window 250. The map overlay in the window 250 includes a map legend and visual indicators associated with clusters within the geographical area displayed. As illustrated in FIG. 6, the visual indicators are cross-hatching or symbols that are associated with different numerical ranges. Unlike FIG. 6, and in some embodiments, the map overlay may be or form a choropleth map and/or a graduated/proportional symbol map. A choropleth map is shaded in using one color, where the darker shades represent high numbers and the lighter shades represent low numbers. In some embodiments, additional details regarding each cluster factor is displayed in the window 50 via one or more graphs 251. Cluster information may also include a listing of identified clusters 252, with each identified cluster being associated with an identification number, a source identification number, and the cluster factor data associated with the identified cluster. In some embodiments, the display parameters 75 include cluster factor(s).

Figure 7:
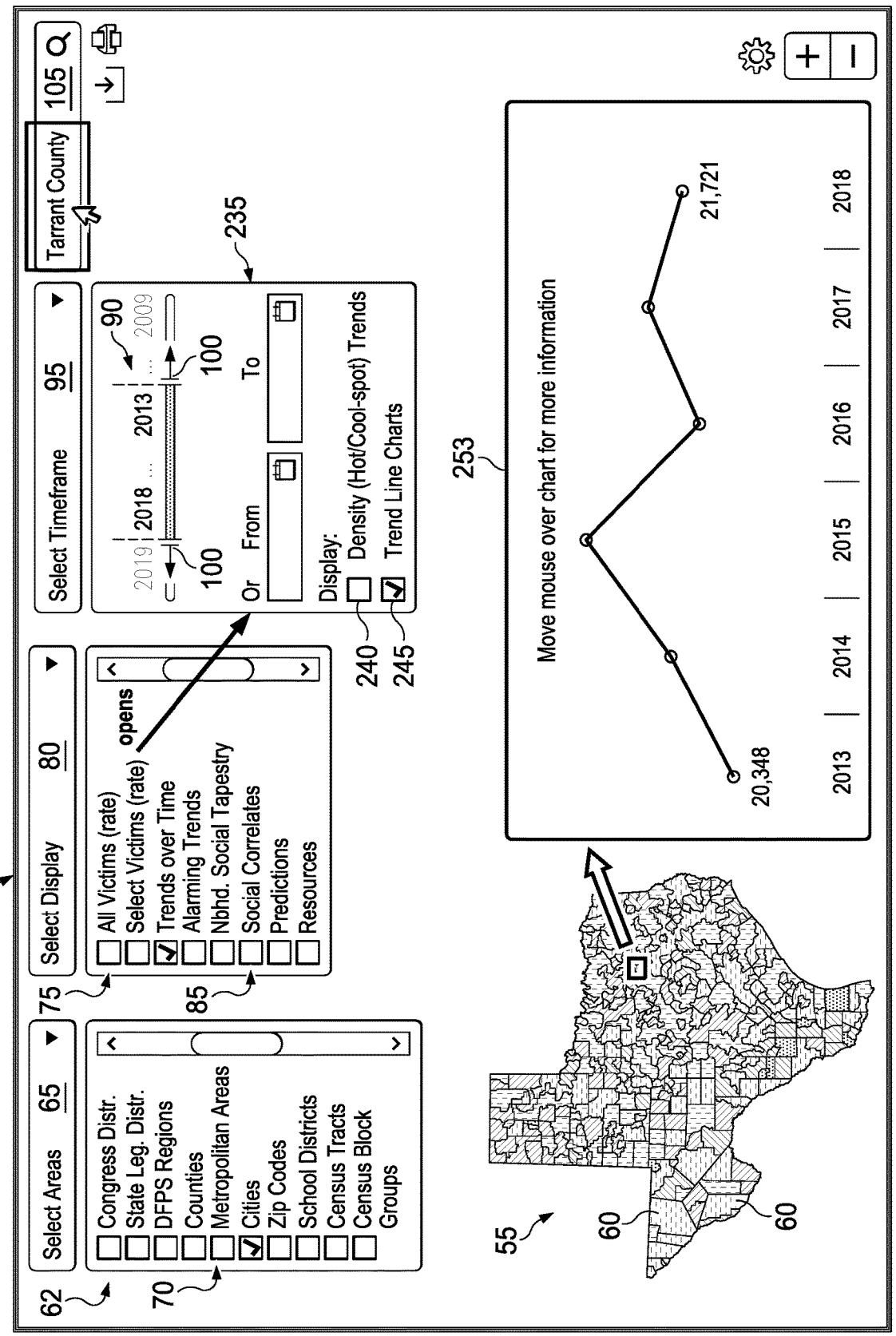

As illustrated in FIG. 7, when the application 15 receives input parameters including the "Trend Line Chart" parameter via button 245, the window 50 displays a pop-up window 253 that displays a trend line for a specific area. In some embodiments, when both the input parameters of "Density (Hot/Cool-spot) Trends" and "Trend Line Charts" options via the buttons 240 and 245 are received by the application 15, the pop-up windows 250 and 253 are displayed simultaneously and side-by-side. As such, the display at the step 230 is dependent on the input parameters received at the step 220.

In some embodiments, the step 220 follows the step 230 such that the input parameters are changed after the output is displayed and the map 55 and/or the chart 115 are updated accordingly in real-time or near real-time.

In some embodiments, the method 200 and/or the input parameters can be altered in a variety of ways. For example, and referring back to FIG. 3, when the system 10 receives an indication that the user 45 has selected the "All Victims" button 85, the map 55 displays information regarding all victims associated with the EC. In some embodiments, the application 15 receives a timeframe selection via the sliders 100 so that the data is filtered based on the selected timeframe. For example, and in FIG. 3, the application 15 has received an input that the data for 2017 is to be displayed on the map 55. In some embodiments, the application 15 receives a selection of one of the boundary identifiers 62 via one of the buttons 65. In response to the selection of one of the boundary identifiers 62, the PRO-TX application 15 illustrates boundaries on the map 55 that are defined by the selected boundary identifier. For example, when the user selects "Congressional district" button 70 as illustrated in FIG. 3, the map 55 is divided into subareas defined by congressional district boundaries. In some embodiments and as illustrated in FIG. 3, the map 55 displays the selected display parameter—using the input parameters received—to display a comparative summary of the number of victims associated with the EC during the year 2017 sorted by congressional district. In some embodiments, the congressional districts are shaded in accordance with their ranking relative to each other or in accordance with a set of ranges.

Figure 8:
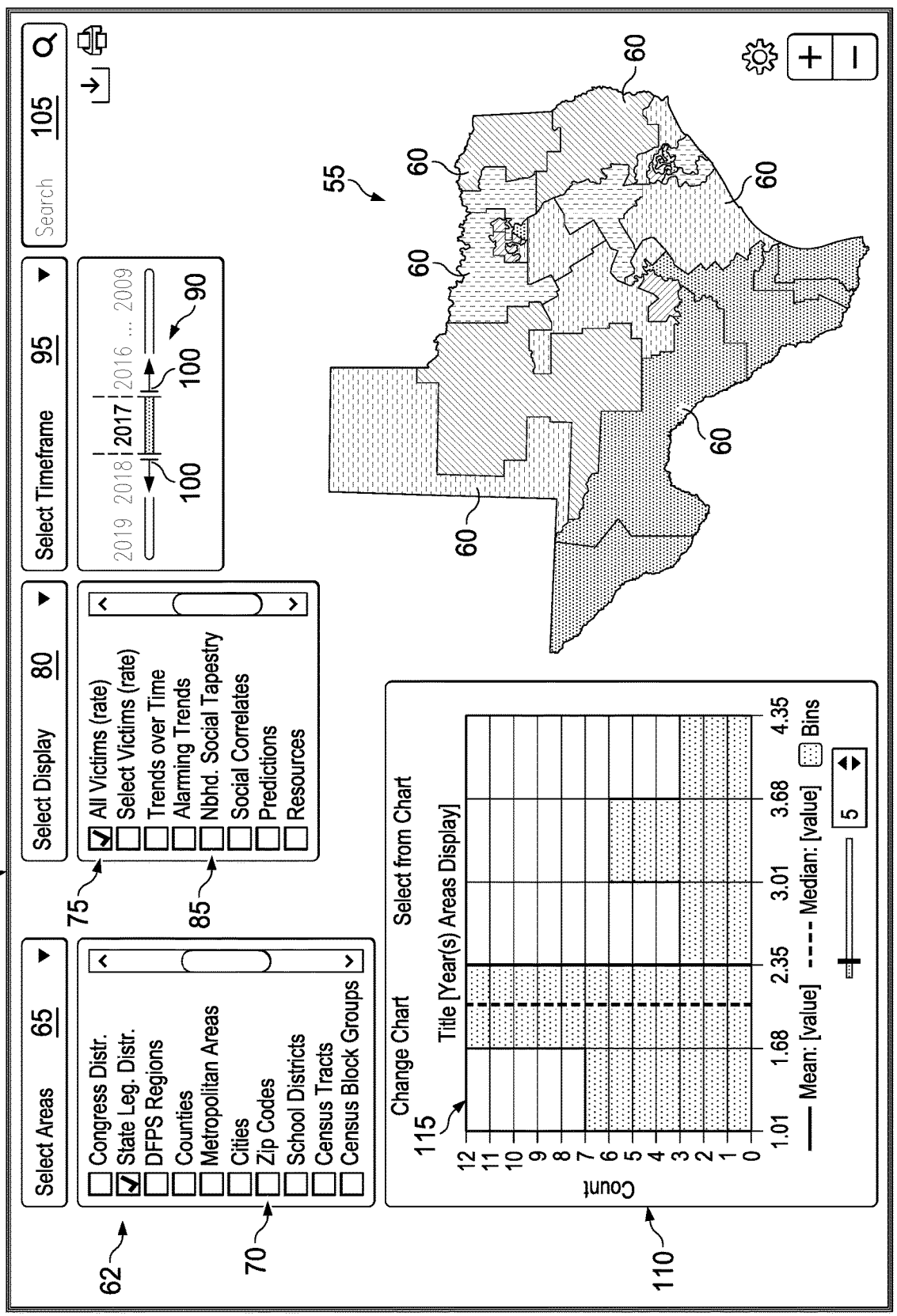

In some embodiments, the map 55 updates upon the application 15 receiving another input from the user 45. For example, when the application 15 receives a selection of a different boundary identifier, then the map 55 is updated accordingly. For example, and as illustrated in FIG. 8, the application 15 received an indication that the user 45 selected the boundary identifier of state legislative district via button 70, and the map 55 and chart 115 are automatically updated accordingly. As such, the system 10 provides a scalable tool, as the analysis of data is quickly performed and displayed across a variety of subareas (e.g., congressional district, state legislative district, counties, etc.). In some embodiments, the manipulation of data at the step 210 allows for data points to be aggregated over numerous spatial boundaries, ranging from census block groups (smallest) to congressional districts (largest). Referencing FIG. 8, upon selection of one of the boundary identifiers 62, the geographical area is sectioned into a plurality of subareas defined by the selected boundary identifier. As a new boundary identifier is selected, the geographical area is updated to be sectioned in a plurality of areas defined by the newly selected boundary identifier. In some embodiments, the subareas 60 are "units of analysis" for all analyses and displays. In some embodiments, contextual information about neighborhood characteristics, surrounding social tapestry, etc. is included from sources for selected boundaries if available, and are estimated based on population and area coverage from other boundaries (e.g. Census Tracts) if not.

Figure 9:
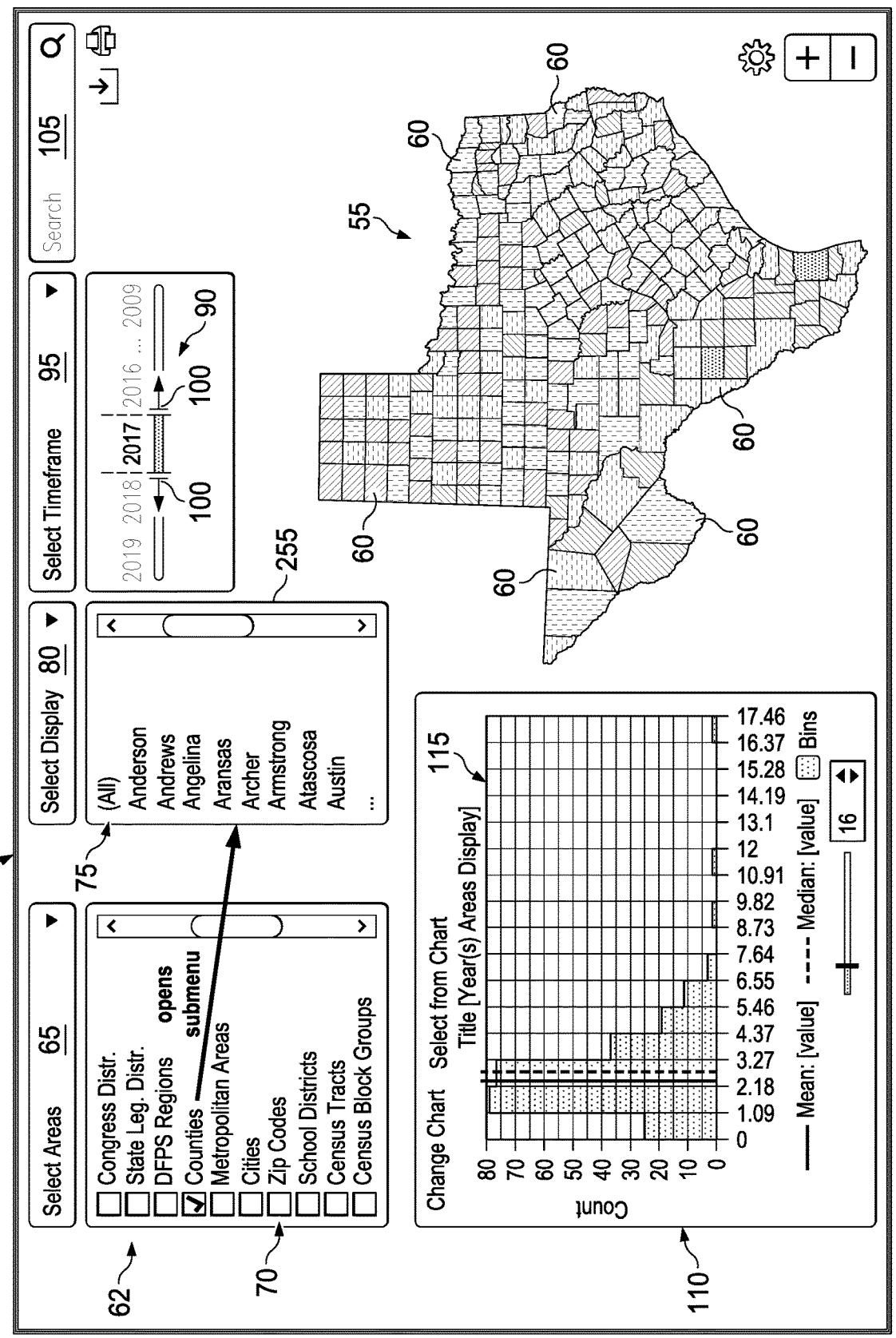

In some embodiments, and as illustrated in FIG. 9, the selection of one of the buttons 70 and/or 85 displays a pop-up box or additional menu 255. For example, and as illustrated in FIG. 9, the selection of one of the boundary identifiers 62 results in the display of the sub-menu 255 on the window 50. In some embodiments, the sub-menu 255 includes a listing of named selectable options defined by a boundary identifier. For example, when the boundary identifier is "Counties", the sub-menu 255 includes a listing of county names. However, in other embodiments the user can select a county by clicking a graphical representation of the county on the map 55. Generally, the map 55 and/or chart 115 are updated upon selection of an option in the sub-menu 255. That is, the boundaries illustrated on the map 55 coincide with the county boundaries for that geographical area. In some embodiments and as illustrated in FIG. 9, the chart 115 depicts the bins associated with the selected geographical areas and the selected display parameter. In some embodiments, the numbers of bins change as a function of the number of distinguished units of analysis.

Figure 10:
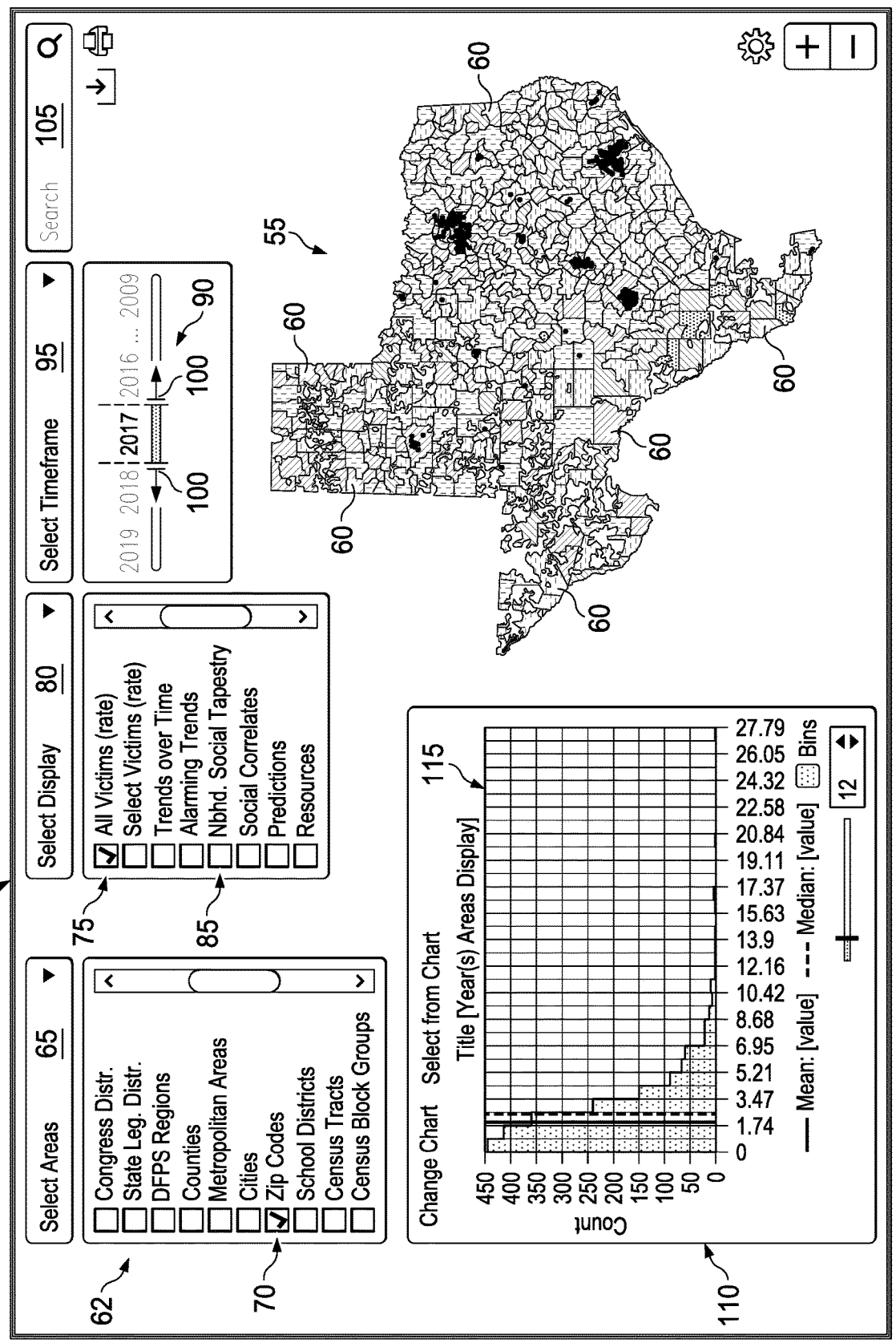

In some embodiments and as illustrated in FIG. 10, data may not be available for all areas of the map 55. When sorting the data by the boundary identifier of "zip code," there may be areas on the map 55 without data. In some embodiments, the bin numbers change to reflect a higher element count of subareas of zip codes relative to the subareas of counties.

Figure 11:
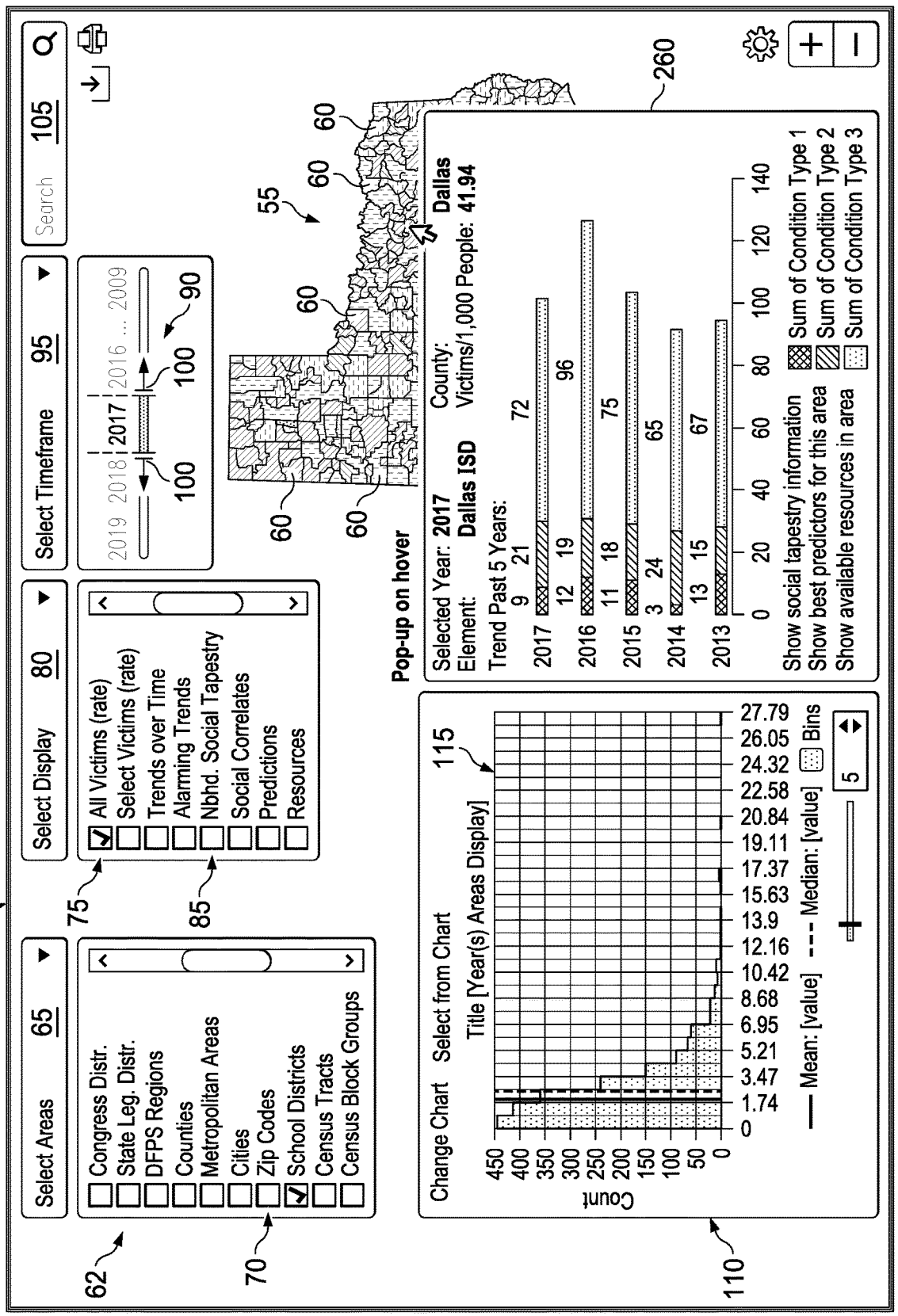

In some embodiments and as illustrated in FIG. 11, the subareas 60 of the map 55 are selectable, and when the application 15 receives an indication of a selection of one of the subareas 60, a pop-up window 260 is displayed on the window 50. In some embodiments, the pop-up window 260 includes detailed information regarding the selected subarea. In some embodiments, the pop-up window 260 includes details or a summary of data specific to the selected subarea. In some embodiments, the application 15 receives an indication of a selection of one of the subareas 60 when the user 45 clicks on one of the subareas 60 or when the user hovers a mouse or other selector over one of the subareas 60. In some embodiments, the window 260 includes results from model predictions and/or what the system 10 identifies as the main drivers or factors associated with the EC in the selected subarea. In some embodiments, the window 260 provides an option to change the display parameter, switch to a display of social neighborhood information, display the best predictor variables, and/or display available resources for that selected subarea.

Figure 12:
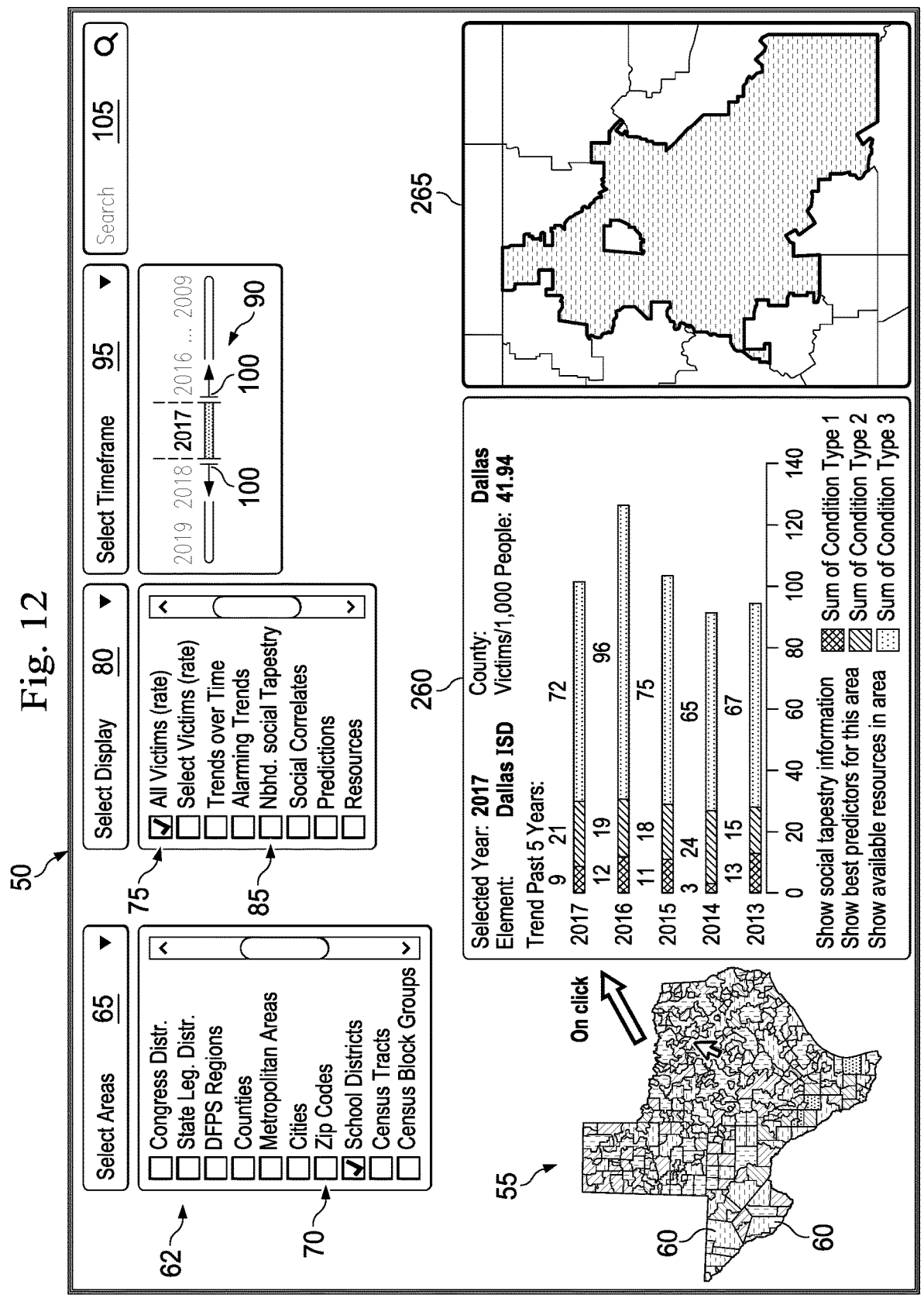

In some embodiments and as illustrated in FIG. 12, upon selection of one of the subareas 60, the application 15 displays an enlarged view of the selected subarea in a pop-up window 265 that may be displayed next to the pop-up window 260.

Figure 13:
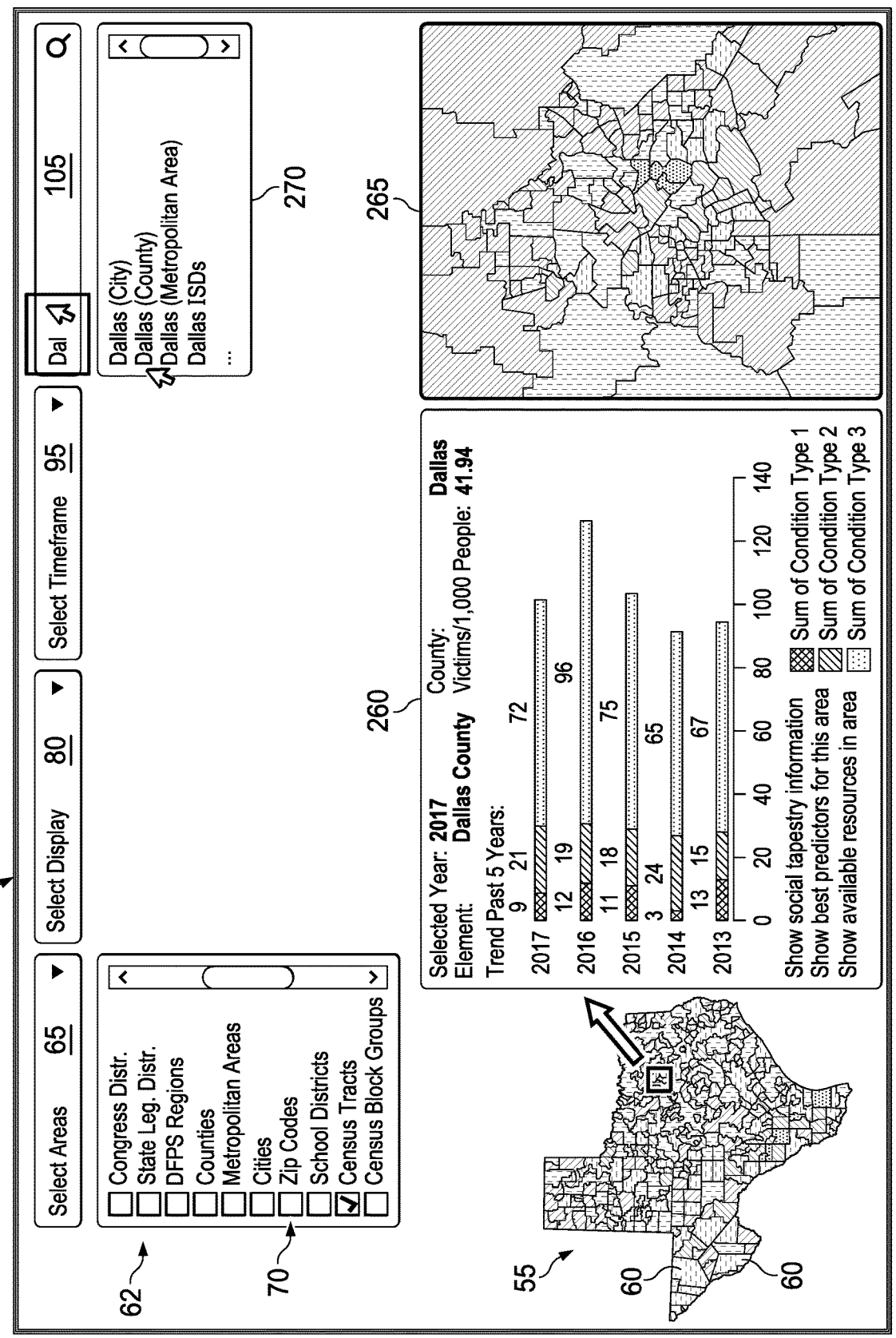

In some embodiments and as illustrated in FIG. 13, the names of subareas 60 are searchable via the input element 105. When text is entered into the input element 105, names of subareas containing the text are displayed in a pop-up window 270 with each of the displayed names being selectable. In some embodiments, the user 45 can search for any city or metropolitan area, zip code, census tract, etc., and the map 55 automatically zooms to the selected/searched subarea. In some embodiments, the search function is assisted with suggestions from the database(s) 20. Generally, charts and statistics will be shown only for the selected subareas. As illustrated in FIG. 13, the text "Dal" is entered into the input element 105, the user 45 selects the subarea of Dallas (County), and the pop-up window 265 provides an enlarged view of Dallas County while the pop-up window 260 provides additional information regarding the display parameters associated with Dallas County, such as detailed trend information, and enables the user 45 to show social context information, strongest correlates, and available resources.

Figure 14:
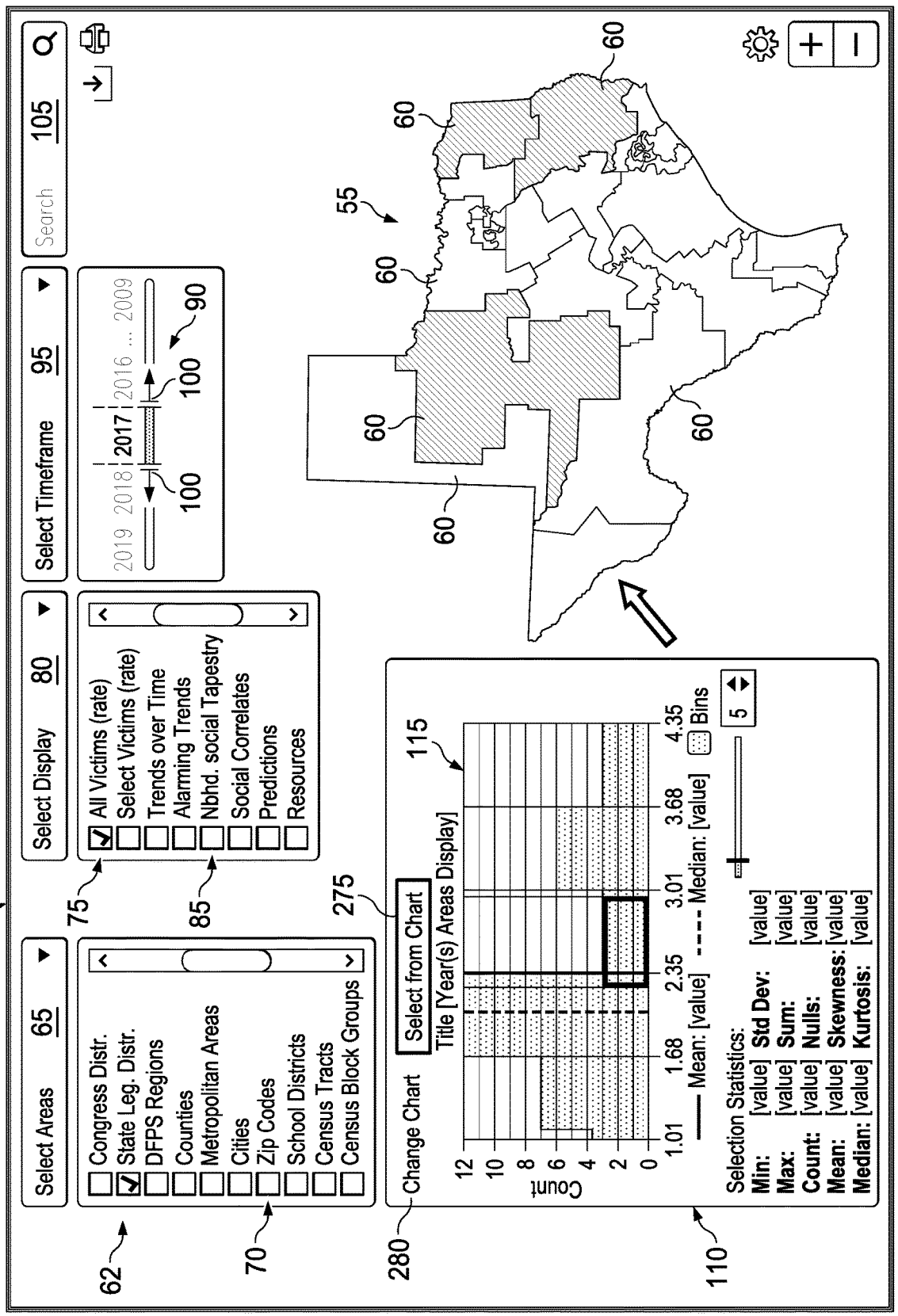

In some embodiments and as illustrated in FIG. 14, portions of the sub-window 110 are selectable. For example, the sub-window 110 includes a selectable portion associated with a "Select from Chart" option 275 and a selectable portion associated with a "Change chart" 280 option. When the "Select from Chart" selectable portion 275 is selected, the application 15 receives instructions regarding the display of data on the map 55 from the chart 115. For example, when a portion of the chart 115 is selected, the areas associated with that portion of the chart 115 are highlighted or otherwise displayed on the map 55. In some embodiments, the subareas 60 associated with the selected portion from the chart 115 are highlighted or otherwise distinguished on the map 55 from the non-selected portions of the map 55.

Figure 15:
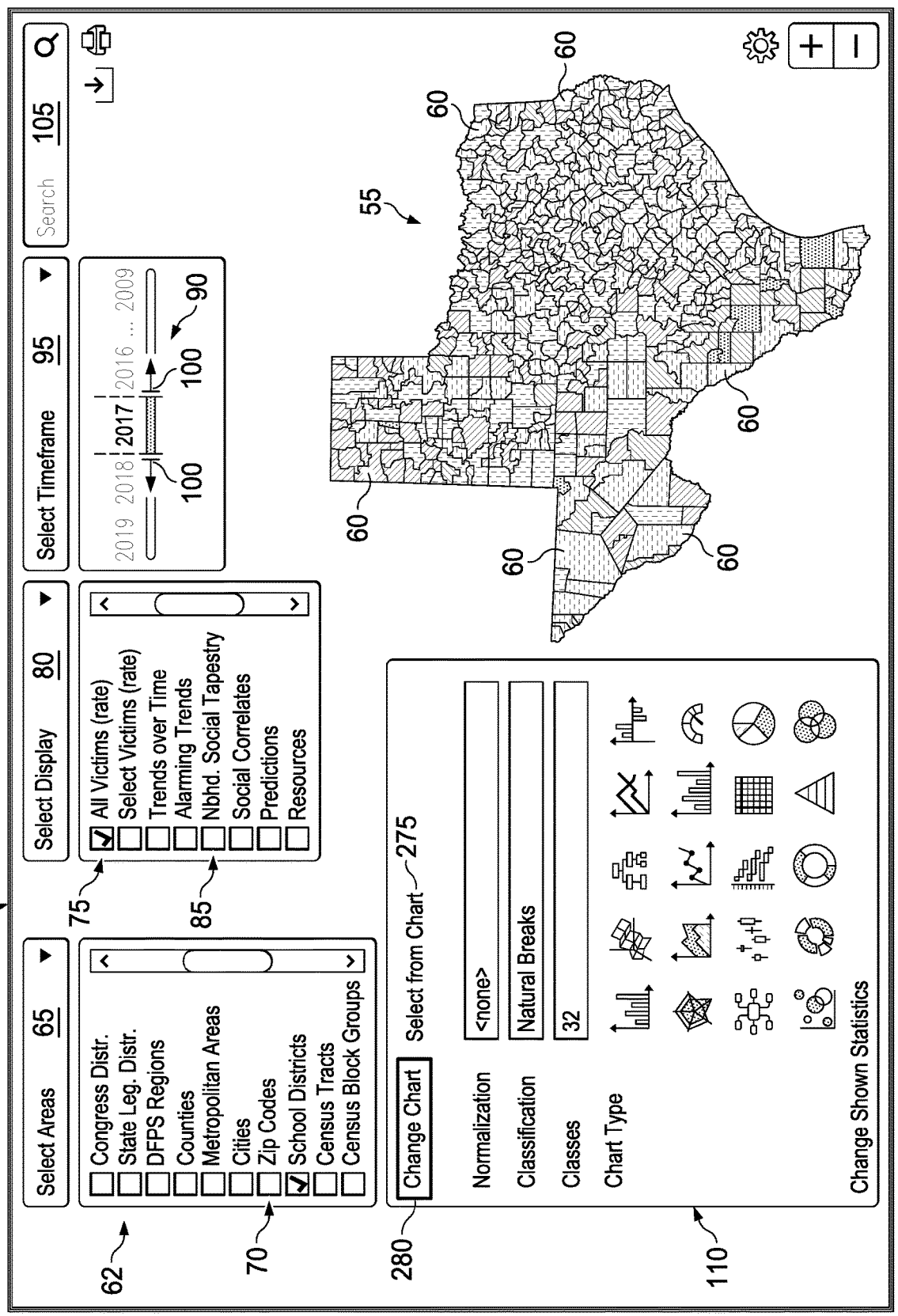

When the "Change Chart" option 280 is selected, as illustrated in FIG. 15, the sub-window 110 is updated to display an option of chart types, input parameters for the classes, classification, and normalization of the data displayed on the map 55. In some embodiments, different normalization functions are offered. In some embodiments, the user 45 can further select different methods of classifying data, different number of classes, and different chart type display options (radar, spider, line, etc.).

Figure 16:
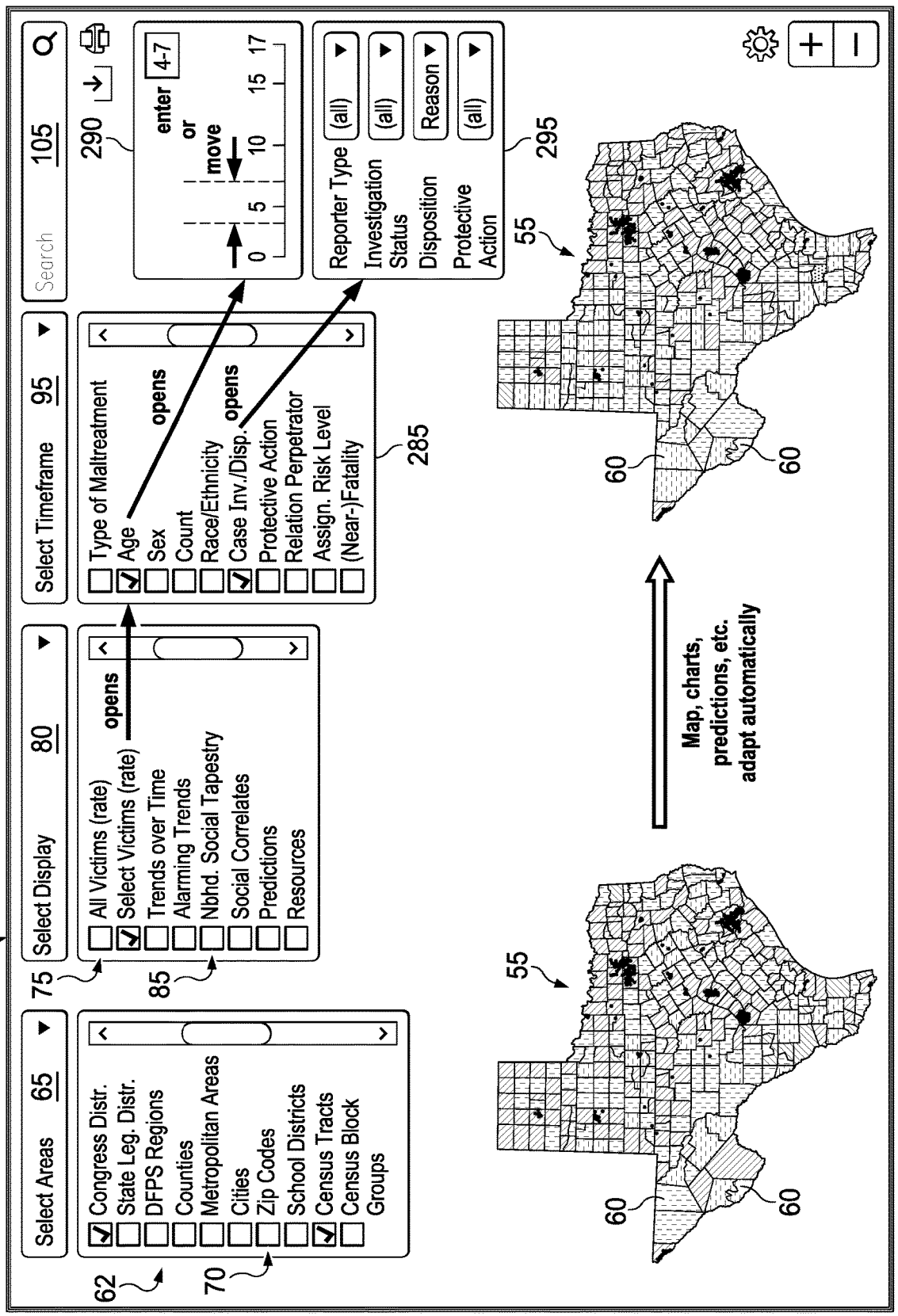

In some embodiments and as illustrated in FIG. 16, when the application 15 receives an indication of a selection of a display parameter, a pop-up window 285 is displayed on the window 50 that allows for additional filters to be applied to that selected display parameter. Additional pop-up windows such as windows 290 and 295 are displayed when additional sub-filters are available for selection. For example, and when the user selects the "Select Victims" display parameter, the pop-up window 285 is displayed that displays additional filters such as for example type of event or condition, age of the victim, sex of the victim, count, race/ethnicity of the victim, a case investigation/disposition, protective action, relation perpetrator, assign risk level, and near-fatality filters. When the application 15 receives an indication that the user 45 has selected "age" from the list of filters, the pop-up window 290 is displayed that allows the user 45 to select a specific age range. When the user 45 selects the case investigation/disposition, the pop-up window 295 is displayed that provides additional selectable filters relating to reporter type, investigation status, disposition, and protective action. In some embodiments, the selection of a sub-filter can be via a radio button, such as a radio button selecting a pending, concluded, or unconfirmed status of an investigation.

Figure 17:
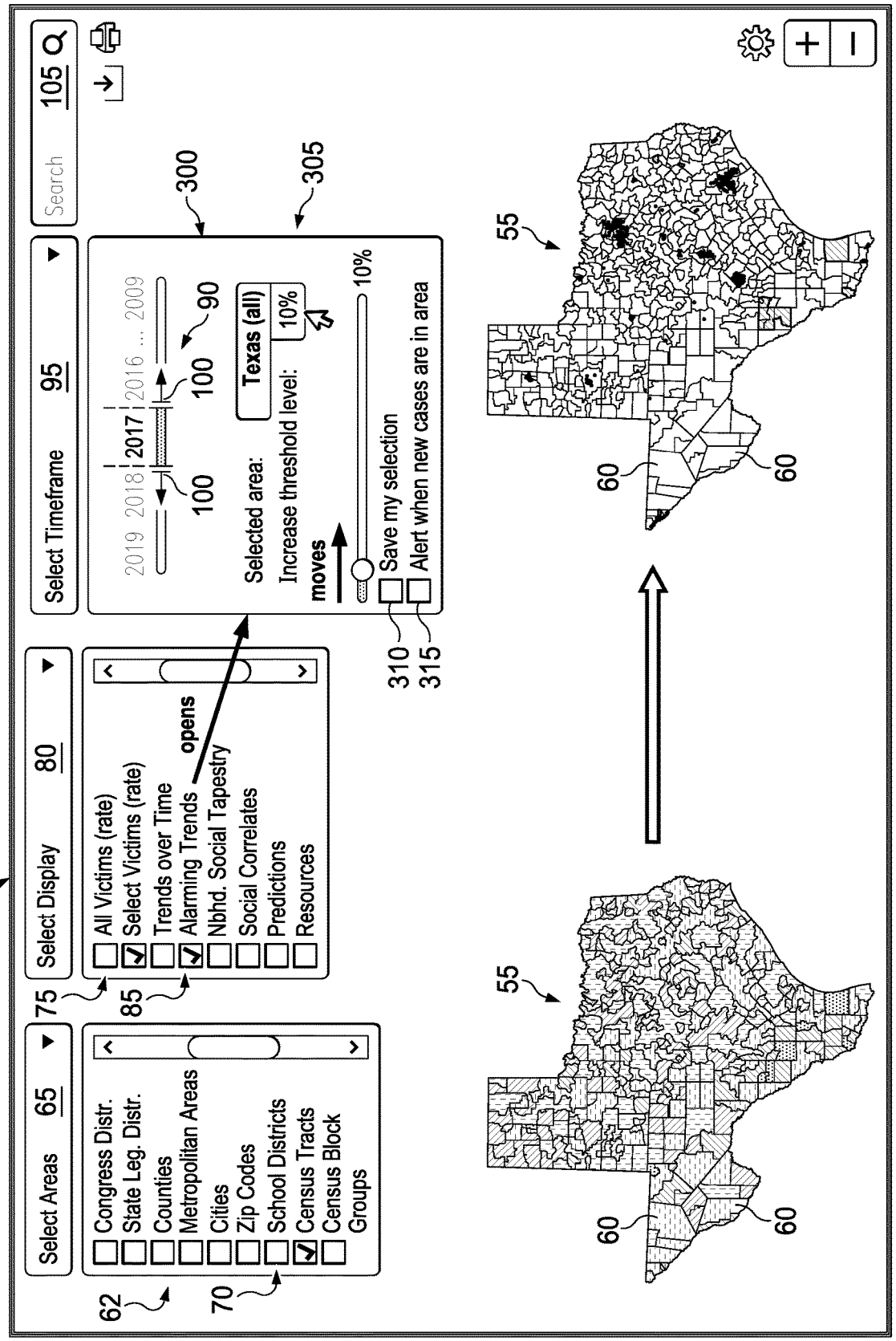

In some embodiments and as illustrated in FIG. 17, alarm thresholds can be placed using the PRO-TX application 15. For example, when the "Alarming Trends" display parameter is selected using one of the buttons 85, a pop-up window 300 is displayed that is designed to receive timeline parameters and a plurality of alert parameters 305. As illustrated, the plurality of alert parameters 305 includes selected areas or selected one(s) of the subareas 60 and an increase threshold level parameter. As illustrated, the selected area is all of Texas and the increase threshold level is 10%. In some embodiments, the PRO-TX application 15 is configured to receive an indication, via boxes 310 and 315, to save the selection and to create an alert when new cases are reported in the selected areas or selected one(s) of the subarea 60. In some embodiments, the alert can include an automated email to a specific email address or an email address to the user 45, a pop-up window displayed on a GUI of the user 45, or some other report that is sent to the user 45 or a predetermined person or group.

Figure 18:
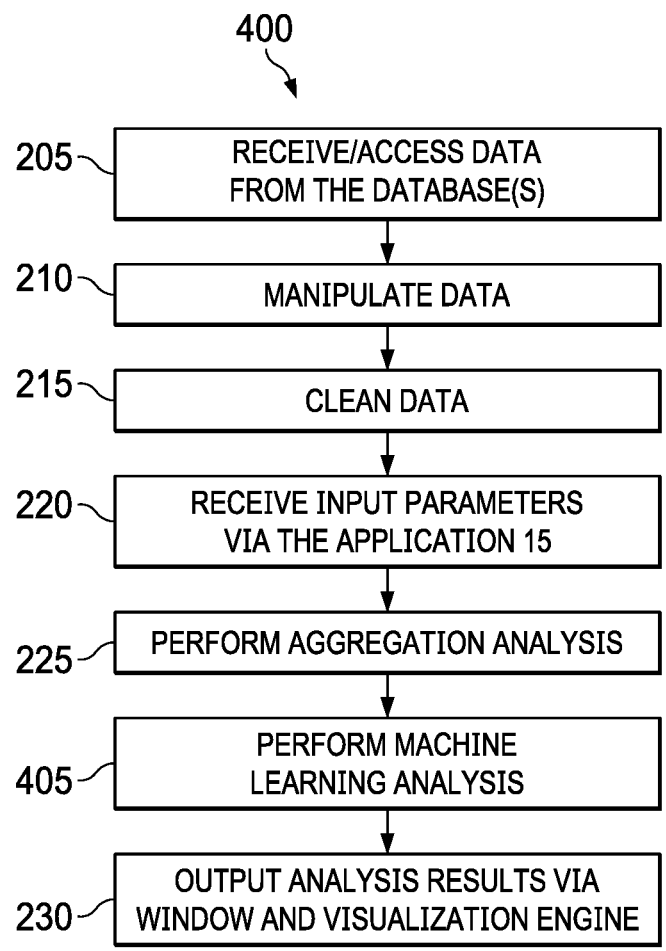
FIG. 18 is a flow chart illustration of another method of operating the system of FIGS. 1-3 and 5-17, according to an example embodiment.

In an example embodiment, as illustrated in FIG. 18 with continuing reference to FIGS. 1-17, a method 400 of operating the system 10 includes the steps of the method 200 and includes, after the step 225 and before the step 230, performing a machine learning analysis at step 405. Description of the steps 205-215 and 225 will not be repeated here.

Figure 19:
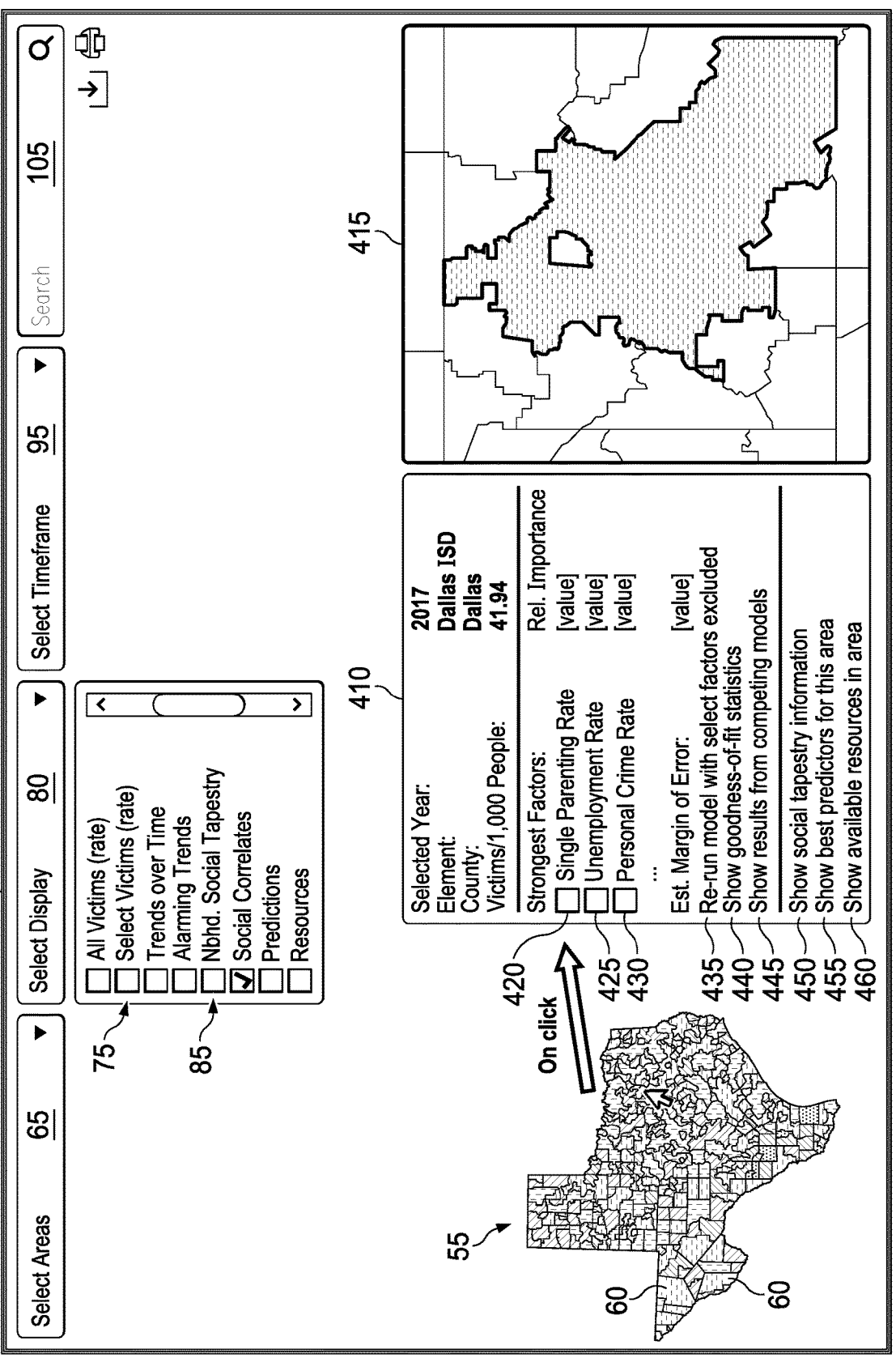
FIGS. 19 and 20 are illustrations of the window of FIG. 3 before, during, or after execution of step(s) of the method of FIG. 18, according to several example embodiments.

In one embodiment and at step 220, the application 15 receives a user input via button 85 associated with the "Social Correlates" display parameter and selection of the Dallas ISD as the selected subarea via either clicking on the map 55 or hovering over the DISD area on the map 55 using a mouse, as illustrated in FIG. 19.

In one embodiment and at step 405, the system 10 uses machine learning to complete an analysis. In some embodiments, the machine learning analysis includes a base level that includes algorithms of or relating to: spatial regressions, random forest, spatial econometrics, etc. that are used for future forecast and identification of area-specific, strongest predictor variables. In some embodiments, the machine learning analysis also includes a meta level that includes algorithms of or relating to: area-specific selection of best-fitting basic level algorithm via goodness-of-fit tests. In some embodiments, the step 405 includes performing an analysis of trends and an analysis regarding social correlates and predictions. For example and as illustrated in FIG. 19, when the application 15 receives the display parameter of "Social Correlates" via the button 85 and a selection of a portion of the map 55 associated with the subarea of DISD, the system 10 uses a base layer that includes three models: a spatially weighed regression type model; a random forest type mode; and a spatial econometric type model during the step 405. In some embodiments, after using the base layer, the system 10 uses a location-specific model selection based on goodness-of-fit comparison of competing layer one models. In some embodiments, the residual analysis and goodness-of-fit-based selection algorithm selects the best model to apply to each location or selected subarea. In some embodiments, the system 10 then provides correlation(s) and prediction(s). In some embodiments, the supercomputer 25 uses machine learning to find relative importance of various census-tract-level-based factors using maltreatment rates through geographically weighed regressions.

In some embodiments, the supercomputer 25 uses machine learning to perform a trend analysis, location analysis for cluster identification, regression analysis, resource analysis, etc. As such, the system 10 identifies new or previously unidentified factors that are correlated with ECs and/or POIs.

At the step 230 of the method 400 and as illustrated in FIG. 19, a pop-up window 410 is displayed that includes the strongest factors for that area and a pop-up window 415 that includes an enlarged illustration of the selected subarea. As illustrated, the pop-up window 410 includes a summary of the selected timeframe, selected subarea, and victim statistics, such as a number of ECs per population group. Moreover, the pop-up window 410 includes the strongest factors and the relative importance of each. Each of the factors is selectable via buttons or windows 420, 425, and 430. In some embodiments, the pop-up window 410 also includes a selectable button 435 that instructs the system 10 to re-run the model with factors selected via buttons 420, 425, and/or 430 excluded; a selectable button 440 that instructs the system 10 to show the goodness-of-it statistics; a selectable button 445 that instructs the system 10 to show results from competing model; a selectable button 450 that instructs the system 10 to show social tapestry information; a selectable button 455 that instructs the system 10 to show the best predictors for the selected area; and a selectable button 460 that instructs the system 10 to show the available resources in the selected area. When the analysis or model is re-run with select factors excluded, the system 10 neutralizes the factor that the user 45 is not interested in.

Figure 20:
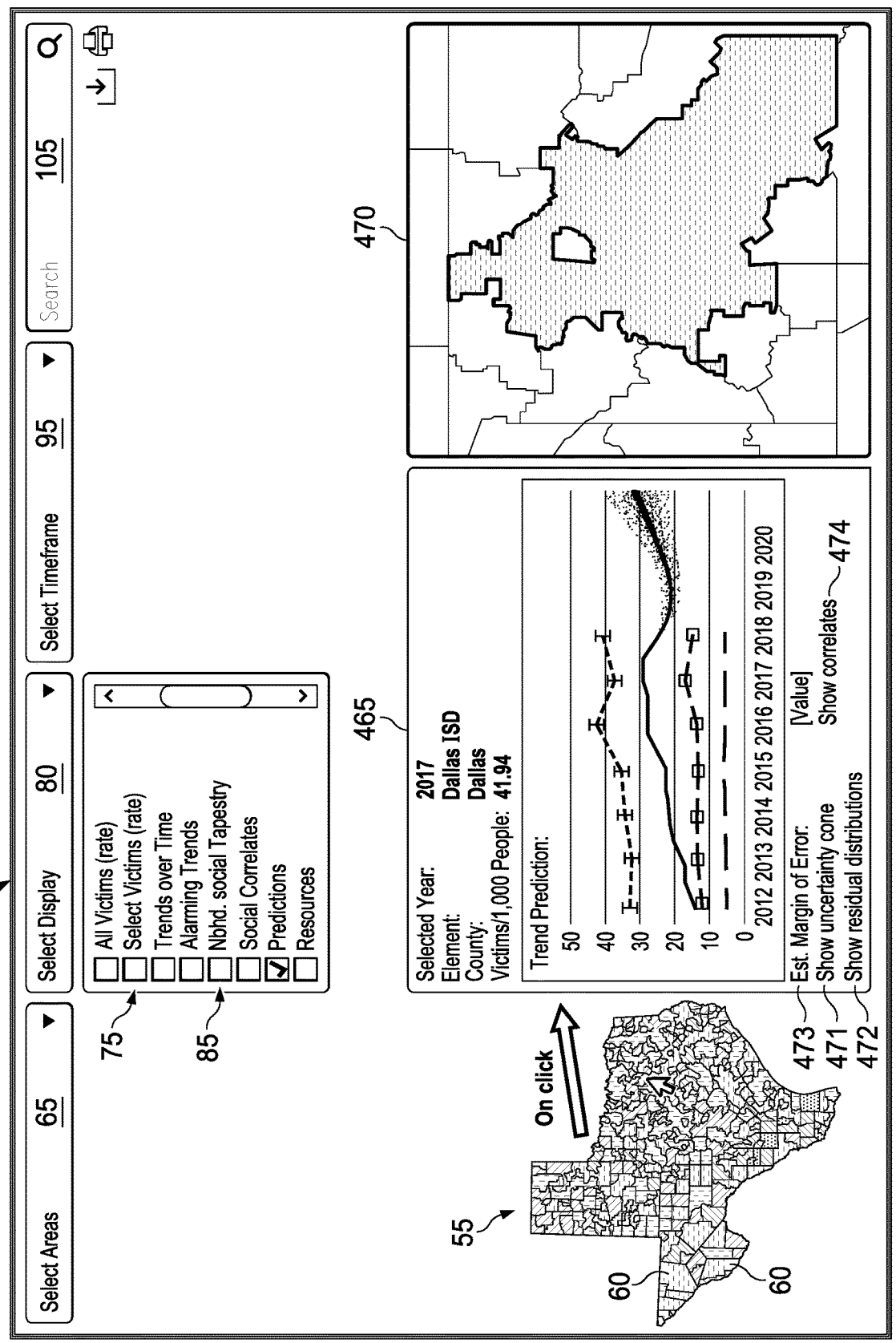

In some embodiments, the method 400 and/or the input parameters can be altered in a variety of ways. For example as illustrated in FIG. 20, when the user 45 selects the "Predictions" display factor and when the user 45 selects a portion of the map 55, a pop-up window 465 is displayed that includes a summary of the selected timeframe, area, and victim statistics, such as number of EC per population group and a pop-up window 470 is displayed that includes an enlarged illustration of the selected subarea. Moreover, the pop-up window 465 displays a trend prediction via a line chart or other. Moreover, in some embodiments the pop-up window 465 displays selectable buttons that instruct the system 10 to display an uncertain cone via button 471, display residual distributions via button 472, display an estimated margin of error or a more in-depth error analysis via button 473, and display correlates via button 474. In some embodiments and using the Predictions display parameter, the system 10 identifies social driving factors for locations and provides information about the availability of local resources and services.

In some embodiments, the data or information displayed over the geographical area(s) in response to the selection of any one of more of the parameters "All Victims"; "Select Victims"; "Trends over Time"; "Alarming Trends"; "Neighborhood Social Tapestry"; "Social Correlates"; and "Predictions" is a resource need layer that is displayed over the geographical area or selected subarea. In some embodiments, the resource need layer is generated by the system 10 and visually depicts a parameter (e.g., victims, trends, correlates, predictions, etc.) associated with a need of a resource within one of subareas. In some embodiments, the parameter varies within the selected subarea. In some embodiments, an increased number of a parameter or factor (e.g., victim of an EC) in an area generally coincides with an increased need for a resource that prevents the EC in that area. For example, and when the EC is an opioid overdose and when a past opioid overdose is a factor in predicting future opioid overdoses, the display of "all victims" of an opioid overdose displayed across the selected subarea is a visual depiction of a parameter (i.e., victims) associated with a need of a resource that prevents or reduces the number of opioid overdose. That is, an area in which a high number of opioid overdoses has occurred is an area in which there is a need for a resource that prevents opioid overdoses from occurring. In some embodiment and when a factor related to an EC varies across a geographical area, the visual depiction of that factor over a geographical area is a resource layer. As new factors are discovered that correlate with an EC, the visual depiction of those new factors that vary across the geographical area is also a resource need layer. Generally, the resource need layer is displayed over the geographical area such that identifiers within the geographical area (i.e., street names, etc.) are still visible.

Figure 21:
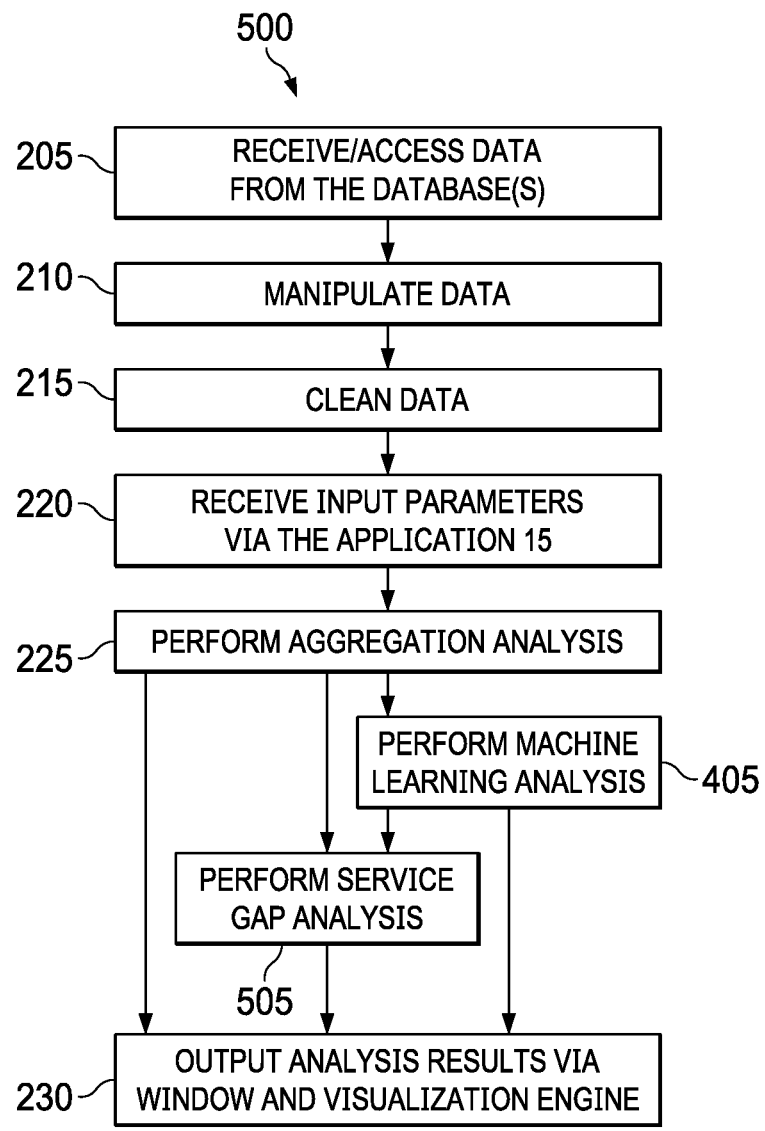
FIG. 21 is a flow chart illustration of yet another method of operating the system of FIGS. 1-3, 5-17, 19, and 20, according to an example embodiment.

In an example embodiment, as illustrated in FIG. 21 with continuing reference to FIGS. 1-20, a method 500 of operating the system 10 includes the steps of the method 400 and includes, after the step 225 or the step 405 and before the step 230, performing a service gap analysis at step 505. Description of the steps 205-215, 225, and 405 will not be repeated here.

Figure 22:
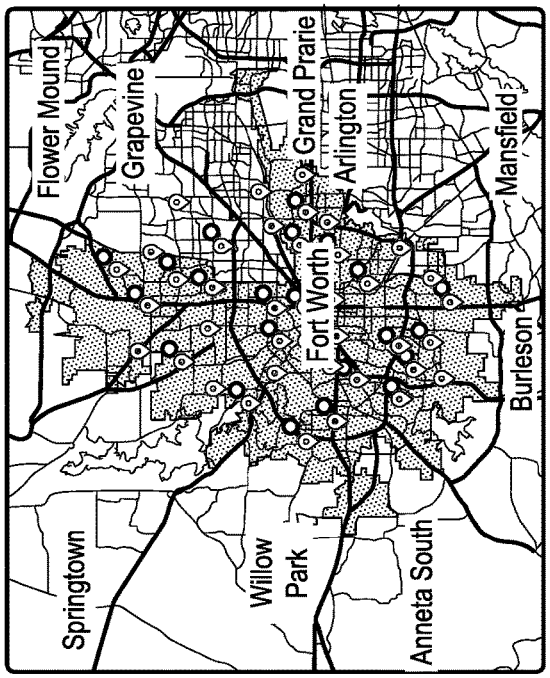
FIGS. 22-24 are illustrations of the window of FIG. 3 before, during, or after execution of step(s) of the method of FIG. 21, according to several example embodiments.

At the step 220 during the method 200, the application 15 receives an indication that the user 45 has selected "Resources" as the display parameter via one of the buttons 85 as illustrated in FIG. 22. In response, the application 15 displays the pop-up window 510 that displays a listing of selectable resources. For example, the pop-up window 510 displays basic needs services, employment services, family violence shelters, father engagement/support, foster care services, health services, home visiting, homeless shelters, job training, parent education, registered child care, and substance abuse treatment.

In one embodiment and at the step 505, the system performs a service gap analysis. In some embodiments, when the user 45 selects one or more of the resources listed in the pop-up window 510, the map 55 is updated to reflect the location of the available resource within the selected subarea. Moreover, and in some embodiments, a summary of the services or resources is provided via a window 515. In some embodiments, the window 515 includes an input element that is configured to receive text that is treated as a search request. In some embodiments, the available resources are searchable or capable of being filtered by name, location such as zip code, etc. In some embodiments, the window 515 displays a listing of ranked names and zip codes. In some embodiments, the names and/or zip codes are ranked alphabetically, by the number of resources located within each, or using another parameter. Generally, the system 10 displays a resource availability layer that represents the resources available within a selected one of the subareas 60, with the resource availability layer displayed over a geographical area, such as a selected one of the subareas 60.

Figure 23:
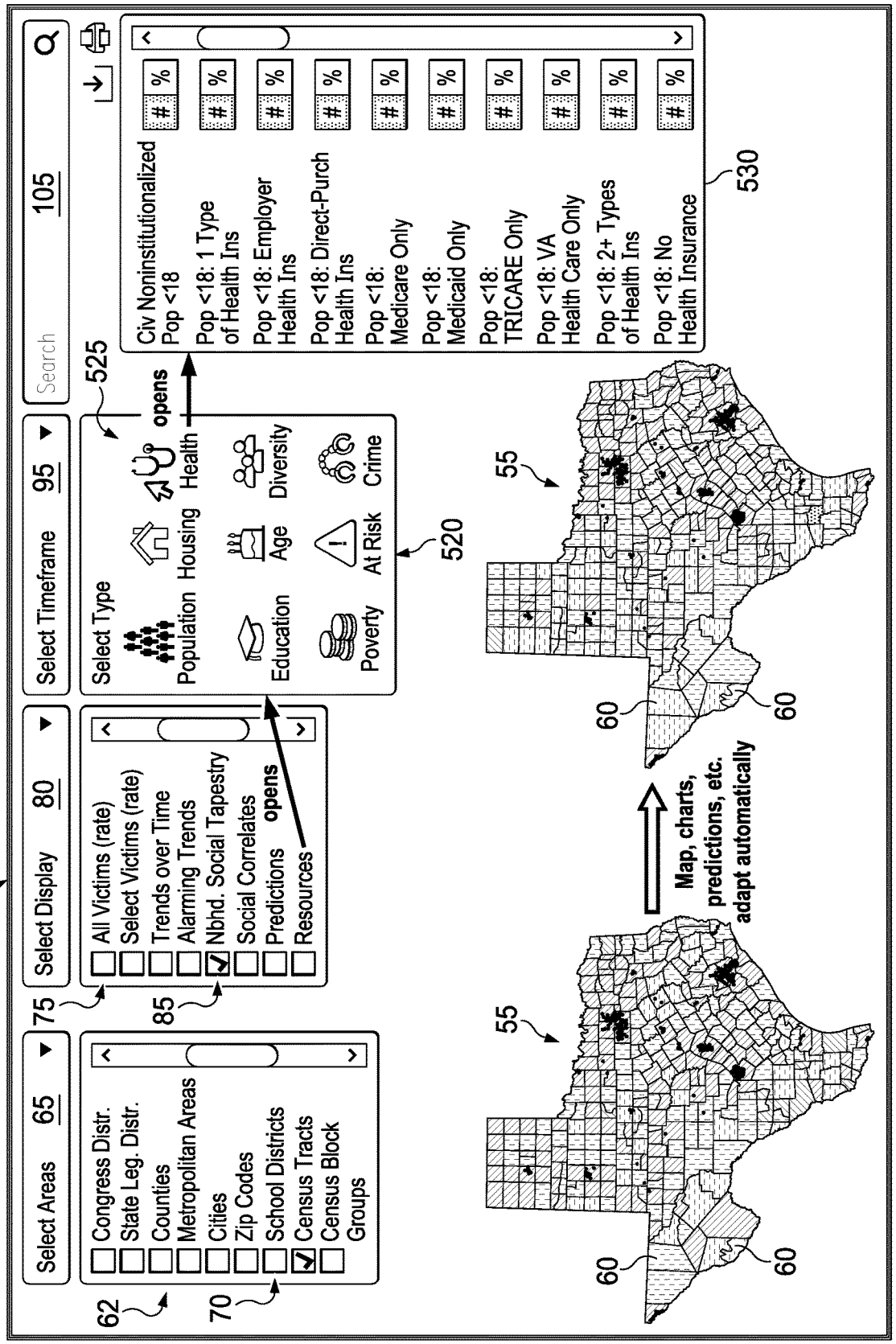

In some embodiments and as illustrated in FIG. 23, types of neighborhood social tapestry filters can be selected. In some embodiments, when the system 10 receives an indication that the display parameter "Neighborhood Social Tapestry" has been selected via one of the buttons 85, the system 10 displays a pop-up window 520 that includes a sub-menu of types of social tapestry options 525. In some embodiments, these options 525 may include population, housing, health, education, age, diversity, poverty, at risk, and crime, among others. In some embodiments, selection of one of the options 525 opens a pop-window 530 that displays additional selectable filters. For example, when the health option is selected, the user 45 has the option of selecting any one or more options relating to health care options, Medicare only, Medicaid only, employer health insurance, etc. Upon selection of one of the options, the map 55 adapts and updates automatically to reflect the user's selection.

The method 500 can be altered in a variety of ways. For example, and in some embodiments, the step 505 of the method 500 occurs after the step 225 and before the step 230. In some embodiments, the step 505 occurs after the step 405 and before the step 230.

Figure 24:
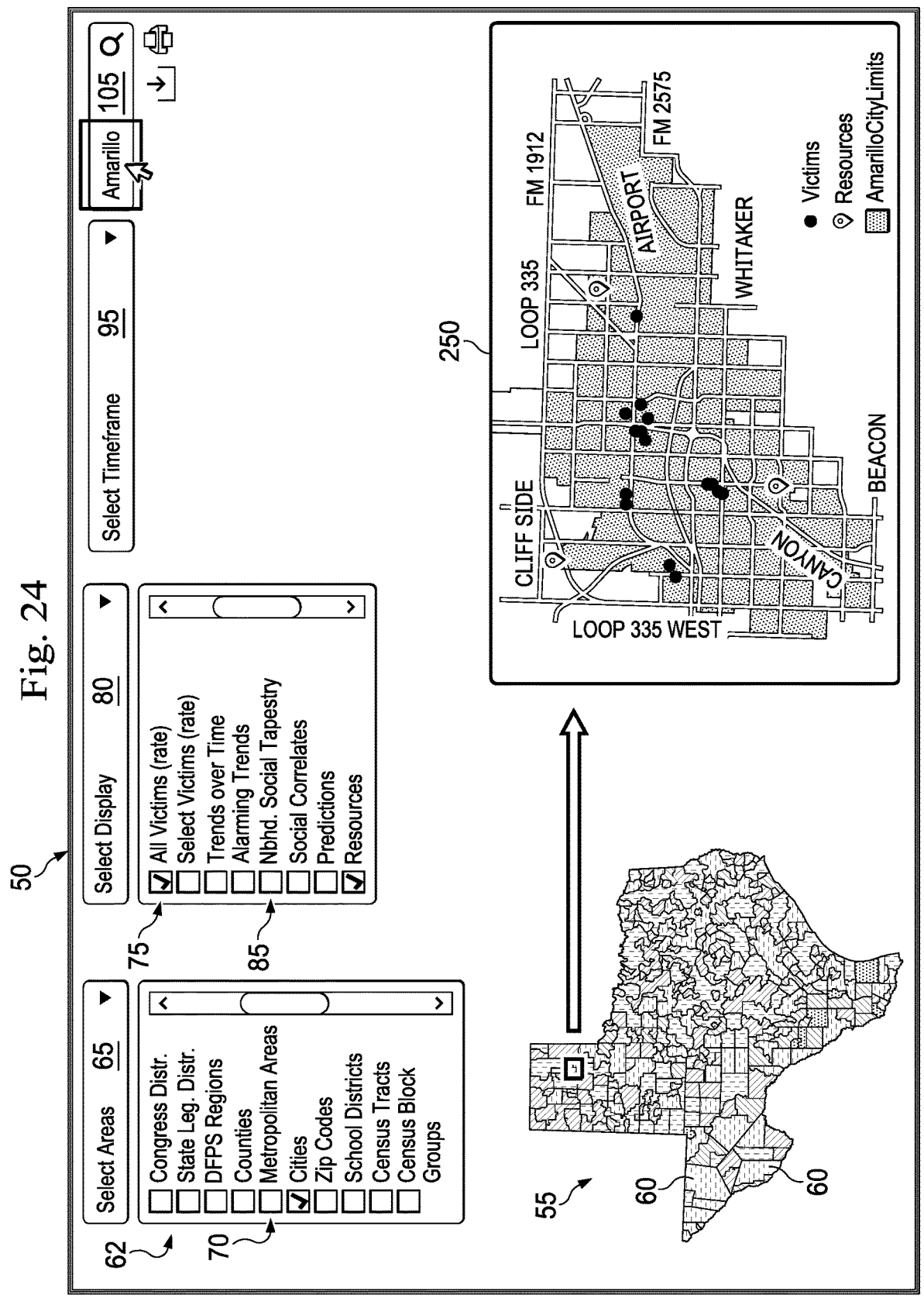

In some embodiments and as illustrated in FIG. 24, the resource availability layer and a need layer are simultaneously displayed over the selected one of the subareas 60 during the method 500. As noted above, the resource need layer may include a display of historical ECs and victims, a projected trend of an EC or victims, etc. and/or any other factors that are indicative of a future EC. In some embodiments, the resource layer includes resources that are categorized or identified by service type based on the North American Industry Classification System ("NAICS") code. When the resource layer and the need layer are simultaneously displayed over one of the selected subareas 60, a visual comparison of the need of the resource and the availability of the resource within the subarea is provided. As such and in one embodiment, the system 10 performs a service gap analysis in that areas in which there is a high need but little resources available are identified. In some embodiments and as noted above, when the user 45 updates the display parameter, the boundary identifier, and/or the selected subarea 60, the system 10 automatically updates the map 55 and/or the window 50 to update the display parameter displayed in the resource need layer, update to section the geographical area into subareas based on the most recently received boundary identifier, and/or the update so that the most selected subarea is displayed along with its respective resource need layer.

In some embodiments, the application 15 includes or displays a data discovery portal via the window 50. In some embodiments, the data discovery portal includes an Agave tenet set up and/or a TAPIS set up. In some embodiments, the data discovery portal is associated with or includes a user management/privilege system. In some embodiments, the data discovery portal includes a dashboard involving cascading style sheets ("CSS") to ensure consistent appearance among pages. In some embodiments, the data discovery portal includes a content management system for page content. In some embodiments, the data discovery portal includes a data depot page where authorized users can have datasets uploaded and defined for projects, which enables the ability for end users to load and create their own data into the analysis engine and have the results displayed on the dashboard. In some embodiments, the data discovery portal includes an interface that accepts data in predefined formats that enable manual addition to a data catalog. In some embodiments, the data discovery portal allows access for use of the original workflow for data analysis for authenticated users. In some embodiments, the data discovery portal allows for datasets to be picked and evaluates existing geospatial analyses to design easy data filters and refresh capabilities. In some embodiments, the data discovery portal allows for the addition of basic query functionalities (e.g., highlight areas of high risk with various overlays).

In some embodiments, at least one of the subareas 60 displayed by the system 10 is at least partially defined by a natural boundary. In some embodiments, at least one of the subareas 60 bridges or spans two different census tracts, census areas, census districts, and/or census blocks. As such, in some embodiments, at least one of the subareas 60 includes only a portion of a census tract, census area, census district, and/or census block.

In some embodiments, the application 15 includes a shareable dashboard that is or includes the window 50. In some embodiments, the window 50 can be printed or exported. In some embodiments, a browser print function allows for the window 50 or portion thereof to be printed. In some embodiments, the application 15 includes User Interface ("UI") components for loading new data layers and exporting or sharing the dashboard. In some embodiments, the system 10 allows for the creation of a portal workspace, which allows for a manual analysis to be submitted as a job. In some embodiments, the system 10 allows for manual processes to be automated and for data to be updated dynamically. In some embodiments, the system 10 allows for an elastic search to be configured. In some embodiments, the system 10 enables modelling and additional data analyses behind the scenes.

In some embodiments, a pop-up window includes a display that is provided in response to a user input. In some embodiments, the pop-up window is a second window displayed over first window when user input is received via the first window. In other embodiments, the pop-up window is not a second window, but forms a portion of the first window.

Generally, the system 10 overcomes technical problems associated with conventional technology/methods. Conventional mapping methods rely on crime, infrastructure, and some housing/sociodemographic predictors. The feeding method of predictor variables gives preference to variables that are available on the exact address, point level, thereby introducing a systematic bias against sociodemographic and community information that is not available on the point address level, but only in aggregate form (e.g. Census Tract level). Due to this bias the models rely essentially on four (4) crime variables: domestic assaults, aggravated domestic assaults, runaways, and drug crimes. Moreover, with conventional methods, the models require a relatively small and homogenous area and are not applicable beyond city-level territories, such as states. Additionally, the models in conventional methods raise privacy concerns due to their very granular resolution and assume a spatially static nexus between predictor and dependent variables, i.e., they are based on fixed coefficients regardless of underlying location (cities and rural areas are known to differ in the importance of social correlates).

Other conventional methods include zip-code based attempts to estimate the risk or probability of an EC. This zip-code method is based on information from the U.S. Census Bureau and state departments. One problem with the zip-code method relates to "risk" values for each zip code being generated by first standardizing values for 1) rate of potential POIs, 2) substance abuse, 3) substantiated EC events, and 4) teen birth rates. Most importantly, the standardized z-scores are then ranked across the roughly 2,400 zip codes in Texas. Lastly, a simple average of rankings across the four (4) factors is calculated and presented as the "estimated risk" score for each zip code. Ranking the z-scores poses a number of problems that call into question the validity and reliability of the estimated risk values. It creates unnecessary data loss, artificially inflates variation, and generates a "flattened," distorted listing of zip codes that ignores the underlying normal-shaped distribution of z-scores. The simple averaging of risk-factor ranking values presumes an equal relative importance of independent variables, an assumption that is not tested. The circumstance that the number of actual confirmed incidents of ECs are entered as a predictive factor of risk, and not as the dependent variable, prohibits any kind of assessment of prediction accuracy, significance, or model power. The nexus between risk factors is presumed to be static both in spatial and temporal terms. There is no assessment of the standardized, relative coefficients of risk factors to examine their significance, and there is no weighing of influence across territory, as would be the case with geographically weighed regressions and social econometrics models. Furthermore, there is no assessment of potential autocorrelation across risk factors. In short, the selection of factors, albeit loosely based on research, is one of convenience and data availability. Neither the prediction model nor any of the included factors have been tested in any meaningful way. This zip-code method prohibits such a test because it would require a dependent variable that is not included on the factor side to avoid tautological circularity. The inability to test the prediction renders the presented information from the zip-code method principally questionable. Aside from the most important shortcoming of the inability to conduct any model or factor testing, the unnecessary and distorting ranking of zip code rate z-scores, as well as the simple averaging of rankings into the final "estimated risk," calls into question whether the actual prediction values have any validity.

The second problem with the convention zip-code method relates to problems related to data sources. The zip-code method is based on information from the U.S. Census Bureau, and two state departments. Time spans and recency of data varies greatly across sources.

Other problems with the zip-code method include: census tracts are polygons and cover a well-defined geographic area; ZIP codes are clusters of lines; the U.S. Postal Service does not define ZIP Code boundaries and a very large number of 5-digit ZIP Codes are P.O. boxes or specific street addresses and thus represent points not even one line; census tracts provide more granularity (73,000 areas) than ZIP Codes (43,000); census tracts are non-changing static geography from decennial census to census; ZIP codes may change at any time; new ZIP codes may be created or eliminated at any time; census tracts cover the U.S. wall to wall; ZIP codes exist only where U.S. mail service is provided; census tracts align coterminously to county boundaries; census tracts have well known/exact boundaries; ZIP codes are groups of lines whose exact structural definition is not officially established; census tracts provide more statistical uniformity averaging 4,000+ population; the population of a single ZIP code can exceed 100,000; census tracts have a large and richer set of associated, more reliable demographic-economic data; true ZIP Code data are only delivery statistics developed by the U.S. Postal Service; the total land area and water area are known for each census tract, to the square meter; the total area covered by a ZIP Code is not known, let alone water area; a unique set of census blocks, and hence demographics, can be associated with each census tract; there is no good way to associate census blocks with ZIP codes; it is entirely feasible to develop and analyze time series data for census tracts; and time series data by ZIP code is risky due to the inherent potential for changing geographic scope.

In some embodiments and using the system 10, EC rates and trends for the entire State of Texas are displayed. Moreover, due to the supercomputer 25, the PRO-TX application 15 can automatically update the display upon the receipt of new or additional input parameters. In some embodiments, the update occurs in real-time or near real-time. In some embodiments, sequencing of scripts ensures a high level of automation. In some embodiments, a user can add his/her data and see its influence while controlling for all the factors that are already being considered. In some embodiments, the PRO-TX application 15 scales from units of analysis as small as Census Tracts/Block Groups to units as large as counties or congressional districts. In some embodiments, the scalability of units renders the information relevant for a wide range of audiences. In some embodiments, the PRO-TX application 15 assists especially field workers or public service workers with the ability to flag certain areas with alarming trends or rate increases. For example, using the system 10, employees or others associated with the available resources can be alerted by increased activity within a specific area. In other embodiments and using the system 10, intake of a potential patient, victim, or perpetrator can be flagged or altered in response to the residence or location of the potential patient, victim, or perpetrator.

In some embodiments, the window 50 is customized with the largest set of filters pertaining to EC characteristics, time ranges, or specific neighborhood and community characteristics. In some embodiments, the models used by the system 10 are based on a large number of predictor variables, including neighborhood, population, housing, infrastructure, and crime as well as other behavioral factors that are ingested from various data sources to paint a comprehensive picture of local conditions. In some embodiments, the system 10 identifies the strongest predictive factors for specific locations and helps in identifying existing resource gaps for services that address the most important factors. In some embodiments, the system 10 employs a multilayered machine-learning enabled analysis process to identify the best-fitting algorithm and model for specific locations. In some embodiments, the system 10 has built-in validation measures to ensure that 1) model specifications are met and 2) applied models and outcomes fit the actual distributions they are predicting.

Other conventional methods using machine-learning based models require somewhat homogenous event distributions and rely mostly on local policing data that is collected within jurisdictional boundaries. As such, these conventional methods can only be applied to small study areas such as cities.

In several example embodiments, execution of one or more steps of the method 200, the method 400, and/or the method 500 enables the user 45 to forgo checking, using the computer 30, several different applications or electronic locations to determine the status of the display parameters within one of the subareas 60 or a need of a resource within one of the subareas 60. Moreover and in some embodiments, execution of one or more steps of the method 200, the method 400, and/or the method 500 enables the user 45 to forgo determining, using the computer 30, the status of the available resources within one of the subareas 60. Moreover and in some embodiments, the steps 225 and/or 405 are performed by the supercomputer 25, which is distinct from the computer 30, such that the processing load of the aggregation analysis and/or the machine learning analysis is associated with the supercomputer 35 and not the computer 30. Moreover, and in some embodiments, the data displayed in the window 50 is generated by the supercomputer 25, with the visualization engine 25a providing a link to the computer 30 to the data displayed in the window 50. Thus, and in some embodiments, execution of one or more steps of the method 200, the method 400, and/or the method 500 enables the computer 30 to forgo performing the aggregation analysis in step 225 and/or the machine learning analysis in step 405. Instead, in several example embodiments, execution of one or more steps of the method 200, the method 400, and/or the method 500 results in the supercomputer evaluating the need of the resource, the availability of the resource, and generating a visual comparison of the need of the resource and the available resource within one of the subareas 60. As such, the displays of the window 50 and the function of the input elements such as buttons 70, 85, sliders 100, and/or input element 105 among others, improves the functioning of the computer 30. That is, eliminating the requirement for displaying other applications, windows, screens, sub screens, etc. on the output device 30f and performing the aggregation and/or machine learning analyses by the processor 30b is eliminated, which reduces the processing load on the processor 30b compared to the computer 30 displaying other applications, windows, screens, sub screens, etc. on the output device 30f and performing the aggregation and/or machine learning analyses. Reducing the processing load of the computer 30 generally improves the performance of the computer 30 such that the available memory of the computer 30 is increased, the processing capacity of the computer 30 is increased therefore making the computer 30 operate more efficiently, and the processing speed of the computer 30 is increased. Thus, the PRO-TX application 15 improves the functioning of the computer 30 itself. That is, the system 10 results in specific improvements in computer capabilities (i.e., reduction of required memory and reduction of processing load).

Moreover, in some embodiments, the system 10 and/or the methods 200, 400, and/or 500 involves a practical application in which the technical field of data analysis and display and/or prevention effort allocation determination is improved. Specifically, the arrangement of components in a non-conventional and non-generic arrangement results in an improvement in the technical field of data analysis and display. That is, the arrangement of the computer 30 on which the GUI 30a is displayed and the supercomputer 25 that includes the visualization engine 25a, allows for remote desktop access to the supercomputer 25 and thus provides an improvement to the functioning of the computer 30 itself, which is also an improvement in the technical field of data analysis and display. Moreover, the resource need layer and the resource availability layer being displayed simultaneously over a graphical representation to provide a visual comparison of the need of the first resource and the availability of the first resource within the one of the first subareas is a non-conventional and non-generic arrangement of components (i.e., resource need layer and resource availability layer) that improves the technical field of prevention effort allocation.

In some embodiments, the system 10 enables the protection of children using data intelligence, geospatial analysis, interactive visualization, and analytical machine learning development. The system 10 includes a user dashboard that is friendly to non-programmers while also offering access to advanced scripting and inclusion of other analytical applications.

In some embodiments, the EC is instances of child maltreatment and the POI is exhibiting sharp in- or decreases of child maltreatment rates. Conventional child health prevention efforts are largely informed by data from local or state vital statistics and public health data, nationally drawn community samples, local parent surveys, agency specific data, health system data, or published queries of large data sets by researchers. All sources have various strengths and limits in informing how to allocate resources, invest in new program development, or conduct service quality improvement. When using data for child health to improve clinical care, programs, or policy, leaders are generally focused on three categories of conditions: common child health conditions (e.g. asthma, obesity, unintentional injuries), uncommon child health conditions (e.g. cancer, select neurologic conditions, congenital abnormalities), and sensitive health conditions governed by laws (e.g. HIV, abuse and neglect, pregnancy). Research continues to demonstrate the importance of community factors as drivers of local maltreatment rates. When the EC is instances of child maltreatment, then one of the factors may include confirmed victims of child abuse (as reported by, for example, the Texas Department of Family Protective Services); select personal crime data; Adverse Childhood Experiences (ACEs) indicators; location of existing, relevant service facilities; and Census Factfinder sociodemographic data.

One of the most important needs in improving child health outcomes across categories of conditions is timely access to real-time data that accounts for multiple variables—at the child level, family level, and community level—while still meeting legal requirements. At the same time, data sets are typically published more than a year or longer from the time of collection and are often focused on a specific dimension. In addition, protections for affected individuals can also hinder creating timely clinical and public health responses. For child abuse, these factors can mean missed opportunities to protect children from emerging risks or, equally concerning, failure to identify positive impact of new programs, which can threaten continued support.

In some embodiments, the ability of the system 10 to integrate multiple variables with current case reports is an improved approach to better matching clinical care, programs, and policies by uncovering emerging trends. By displaying changes in case occurrences against factors that have been associated at a smaller geographical area, leaders should be better informed. Rather than adjusting for an entire state or county, which may miss local circumstances and context, leaders can tailor support to reflect and match local needs. This flexibility is particularly important in large states such as Texas with over 7 million children who are geographically, economically, and culturally diverse.

In some embodiments, the strength of the system 10, particularly in child abuse but for other conditions as well, is in informing leaders of early changes in rates so they can then analyze reasons based on locale. For example, if community A invests heavily in child abuse awareness and rates increase, this is a positive trend which then needs to be responded to for intervention. At the same time, if community B has an increase in child abuse and there has also been an increase in public housing, it may be there are more reports because of co-location of low income families. And in community C, if there is an increase in child abuse after closure of low cost health care, there may be a link and an unmet need.

In some embodiments, the system 10 allows early trend analysis so communities can ask appropriate questions at a narrower scale to better improve child health outcomes. By quickly analyzing hundreds of factors against case reports, leaders can respond more quickly, intervene, and measure the impact of those interventions using data.

As national experts continue to develop zip code level and other geographic boundaries pictures of public health, the focus of the system 10 on child health, starting with abuse and neglect, allows experts to develop the model by bridging innovative data analytics with decades of child abuse research in partnership with state and local leaders. This bridging allows better analysis of the findings to validate the model. With each new child health application, a similar development approach will strengthen the power of this data analytics platform and sets it apart from other available applications.

In some embodiments, the system 10 allows for the map, display, charts, and statistics to change automatically with selections of different areas, area boundaries, and timeframes. In some embodiments, the user 45 can adjust the numbers of "bins," which is a data classification that distinguish between categories. In some embodiments, the map 55 can be zoomed by mouse click, drag, or by clicking on the +/−icons.

In some embodiments, the inputs received by the user 45 is communicated to the supercomputer 25, the supercomputer 25 completes an analysis based on the inputs, and the output of the analysis is then displayed on the window 50. As such, updating the window 50 in real-time includes a period of time between the application 15 receiving the inputs and displaying an updated map 55 on the window 50. In some embodiments, the period of time is any one or more of less than 10 seconds, less than 5 seconds, less than 3 seconds, less than 2 seconds, less than 1 second.

Figure 25:
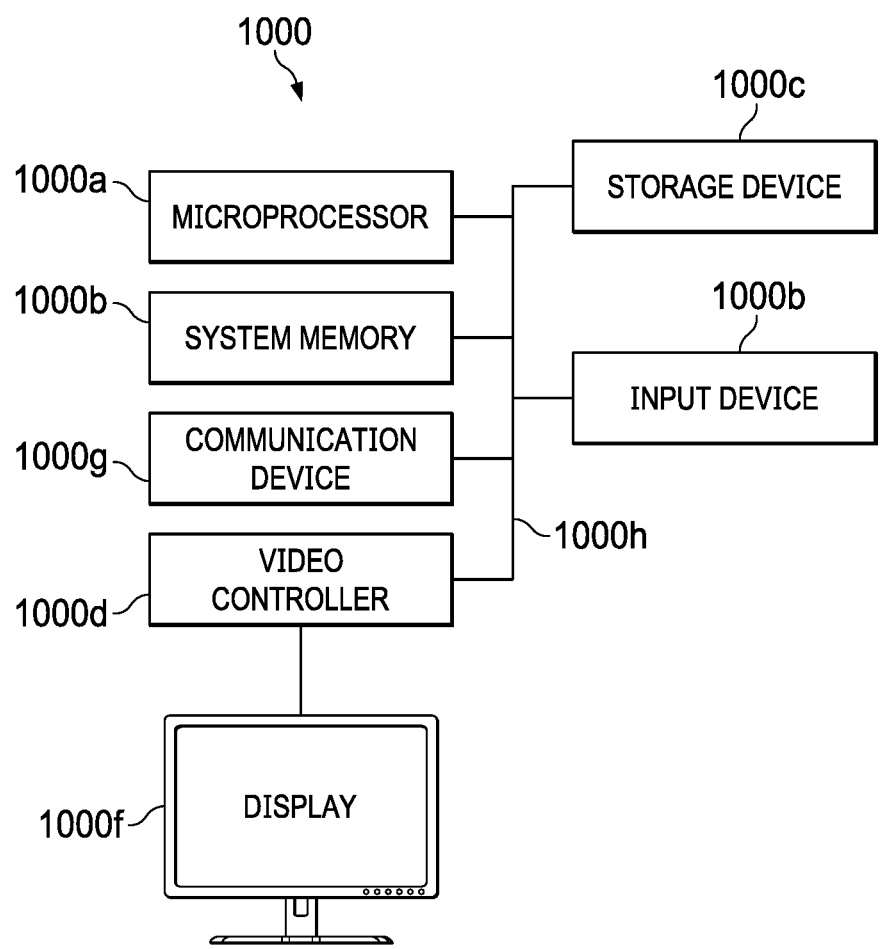
FIG. 25 is a diagrammatic illustration of a node for implementing one or more example embodiments of the present disclosure, according to an example embodiment.

In an example embodiment, as illustrated in FIG. 25 with continuing reference to FIGS. 1-24, an illustrative node 1000 for implementing one or more of the example embodiments described above and/or illustrated in FIGS. 1-24 is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In several example embodiments, the storage device 1000c may include a floppy drive, hard drive, CD-ROM, optical drive, any other form of storage device and/or any combination thereof. In several example embodiments, the storage device 1000c may include, and/or be capable of receiving, a floppy disk, CD-ROM, DVD-ROM, or any other form of computer-readable medium that may contain executable instructions. In several example embodiments, the communication device 1000g may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones and cell phones.

In several example embodiments, one or more of the components of the systems described above and/or illustrated in FIGS. 1-24 include at least the node 1000 and/or components thereof, and/or one or more nodes that are substantially similar to the node 1000 and/or components thereof. In several example embodiments, one or more of the above-described components of the node 1000, the system 10, and/or the example embodiments described above and/or illustrated in FIGS. 1-24 include respective pluralities of same components.

In several example embodiments, one or more of the applications, systems, and application programs described above and/or illustrated in FIGS. 1-24 include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a non-transitory computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000a, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

In one aspect, the present disclosure is directed to a method that includes displaying, on a graphical user interface ("GUI") of a computer, a graphical representation of a geographical area sectioned into a plurality of first subareas defined by first boundaries; displaying, on the GUI, a resource need layer over the graphical representation; wherein the resource need layer visually depicts a first parameter associated with a need of a first resource within one of the first subareas; and wherein the depiction of the first parameter varies within the one of the first subareas; and displaying, on the GUI, a resource availability layer over the graphical representation; wherein the resource availability layer visually depicts a second parameter indicating the availability of the first resource within the one of the first subareas; wherein the depiction of the second parameter varies within the one of the first subareas; and wherein the resource need layer and the resource availability layer are displayed simultaneously over the graphical representation to provide a visual comparison of the need of the first resource and the availability of the first resource within the one of the first subareas. In one embodiment, the method also includes receiving, via the GUI, a first user input indicating a selection of a boundary identifier; and in response to the receipt of the indication of the selection of the boundary identifier, simultaneously updating: the graphical representation of the geographical area such that the geographical area is sectioned into a plurality of second subareas defined by second boundaries associated with the boundary identifier; the resource need layer so that the resource need layer visually depicts the first parameter associated with the need of the first resource within one of the second subareas; and the resource availability layer so that the resource availability layer visually depicts the second parameter indicating the availability of the first resource within the one of the second subareas; wherein the depiction of the first parameter varies within the one of the second subareas; and wherein the depiction of the second parameter varies within the one of the second subareas. In one embodiment, the method also includes receiving, via the GUI, a second user input indicating a selection of a second resource; and updating, in response to the receipt of the indication of the selection of the second resource, the resource need layer so that the resource need layer visually depicts the first parameter associated with the need of the second resource within one of the second subareas. In one embodiment, wherein each of the first subareas defined by first boundaries is selectable; and wherein the method further comprises: receiving an indication that one of the first subareas has been selected; and in response to the receipt of the indication that one of the first subareas has been selected, displaying information regarding the need of the first resource within the selected first subarea. In one embodiment, the first resource is designed to prevent an event or condition from occurring; and wherein the information regarding the need of the first resource within the selected first subarea comprises a number of historical events or historical conditions that occurred within the selected first subarea. In one embodiment, the method also includes displaying, on the GUI, a prediction associated with the event or condition occurring within the selected first subarea. In one embodiment, at least one of the first subareas is at least partially defined by a natural boundary. In one embodiment, the need of the first resource within one of the first subareas is based on data comprising demographic data from a census; other data from the census; and crime data. In one embodiment, the first parameter is a location associated with a victim of a crime. In one embodiment, the first parameter is a location associated with a patient diagnosed with a medical condition.

In yet another aspect, the present disclosure is directed to method comprising: displaying, on a graphical user interface ("GUI") of a computer, a window that includes a first graphical representation of a geographical area; wherein the geographical area can be sectioned into a plurality of subareas defined by a selected boundary identifier; wherein the selected boundary identifier is one of a plurality of boundary identifiers; displaying, on the GUI, a first menu listing the plurality of boundary identifiers; displaying, on the GUI, a second menu listing a plurality of parameters associated with an event or condition; displaying, on the GUI, an input control configured to receive a selected period of time; receiving via the GUI: a first user input identifying the selected boundary identifier from the first menu; a second user input identifying a selected parameter from the second menu; and a third user input identifying the selected period of time; in response to receiving the first, second, and third user inputs, displaying, on the GUI, a second graphical representation of the geographical area sectioned into a plurality of subareas that are defined by the selected boundary identifier and a depiction of data relating to the selected parameter within the selected period of time displayed within each sectioned subarea; wherein any one of the sectioned subareas within the second graphical representation of the geographical area is selectable; receiving, by one or more processors and via the GUI, an indication that one of the sectioned subareas has been selected; and in response to receiving the indication that one of the sectioned subareas has been selected, displaying, on the GUI, information associated with the parameters associated with the selected sectioned subarea and within the selected period of time. In one embodiment, the selected sectioned subarea is at least partially defined by a natural boundary. In one embodiment, the method also includes: receiving, by the one or more processors and via the window, an indication that another of the plurality of subareas has been selected; and in response to receiving the selection of the another subarea, displaying, on the GUI, information regarding the factors within the another selected subarea and within the selected period of time. In one embodiment, the method also includes: (a) receiving, by the one or more processors and via the GUI, any one or more of: a fourth user input; a fifth user input; and a sixth user input; wherein the fourth user input identifies another selected boundary identifier from the first menu; wherein the fifth user input identifies another selected parameter from the second menu; and wherein the sixth user input identifies another selected period of time; and (b) automatically updating the second graphical representation of the geographical area in accordance with input(s) received in the step (a). In one embodiment, the selected parameter is associated with a prediction of the event or the condition being present or occurring within the selected subarea; and wherein the method further comprises displaying, on the GUI, a prediction associated with the event or the condition being present or occurring within the selected subarea. In one embodiment, the selected sectioned subarea is any one of a governmental representative district; a metropolitan area; an educational district; a municipal area; a county; a census tract; and a census block group. In one embodiment, the information regarding the parameters within the selected subarea and within the selected period of time comprise the number of historical events or conditions that occurred within the selected subarea. In one embodiment, the method also includes displaying, on the GUI, a representation of available resources to address the event or the condition as a resources layer to the selected subarea; wherein the resources layer overlays the second graphical representation of the geographical area. In one embodiment, the historical events or conditions that occurred within the selected sectioned subarea are crimes. In one embodiment, the historical events or conditions that occurred within the selected sectioned subarea are crimes against a victim having an age that is within a specific age range.

In yet another aspect, the present disclosure is directed an apparatus that includes a non-transitory computer readable medium having stored thereon a plurality of instructions, wherein the instructions are executed with at least one processor so that the following steps are executed: displaying, on a graphical user interface ("GUI") of a computer, a graphical representation of a geographical area sectioned into a plurality of first subareas defined by first boundaries; displaying, on the GUI, a resource need layer over the graphical representation; wherein the resource need layer visually depicts a first parameter associated with a need of a first resource within one of the first subareas; and wherein the depiction of the first parameter varies within the one of the first subareas; and displaying, on the GUI, a resource availability layer over the graphical representation; wherein the resource availability layer visually depicts a second parameter indicating the availability of the first resource within the one of the first subareas; wherein the depiction of the second parameter varies within the one of the first subareas; and wherein the resource need layer and the resource availability layer are displayed simultaneously over the graphical representation to provide a visual comparison of the need of the first resource and the availability of the first resource within the one of the first subareas. In one embodiment, the instructions are executed with at least one processor so that the following step(s) are executed: receiving, via the GUI, a first user input indicating a selection of a boundary identifier; and in response to the receipt of the indication of the selection of the boundary identifier, simultaneously updating: the graphical representation of the geographical area such that the geographical area is sectioned into a plurality of second subareas defined by second boundaries associated with the boundary identifier; the resource need layer so that the resource need layer visually depicts the first parameter associated with the need of the first resource within one of the second subareas; and the resource availability layer so that the resource availability layer visually depicts the second parameter indicating the availability of the first resource within the one of the second subareas; wherein the depiction of the first parameter varies within the one of the second subareas; and wherein the depiction of the second parameter varies within the one of the second subareas. In one embodiment, the instructions are executed with at least one processor so that the following steps are executed: receiving, via the GUI, a second user input indicating a selection of a second resource; and updating, in response to the receipt of the indication of the selection of the second resource, the resource need layer so that the resource need layer visually depicts the first parameter associated with the need of the second resource within one of the second subareas. In one embodiment, wherein each of the first subareas defined by first boundaries is selectable; and wherein the instructions are executed with at least one processor so that the following steps are executed: receiving an indication that one of the first subareas has been selected; and in response to the receipt of the indication that one of the first subareas has been selected, displaying information regarding the need of the first resource within the selected first subarea. In one embodiment, the first resource is designed to prevent an event or condition from occurring; and wherein the information regarding the need of the first resource within the selected first subarea comprises a number of historical events or historical conditions that occurred within the selected first subarea. In one embodiment, the instructions are executed with at least one processor so that the following steps are executed: displaying, on the GUI, a prediction associated with the event or condition occurring within the selected first subarea. In one embodiment, at least one of the first subareas is at least partially defined by a natural boundary. In one embodiment, the need of the first resource within one of the first subareas is based on data comprising demographic data from a census; other data from the census; and crime data. In one embodiment, the first parameter is a location associated with a victim of a crime. In one embodiment, the first parameter is a location associated with a patient diagnosed with a medical condition.

In yet another aspect, the present disclosure is directed an apparatus that includes a non-transitory computer readable medium having stored thereon a plurality of instructions, wherein the instructions are executed with at least one processor so that the following steps are executed: displaying, on a graphical user interface ("GUI") of a computer, a window that includes a first graphical representation of a geographical area; wherein the geographical area can be sectioned into a plurality of subareas defined by a selected boundary identifier; wherein the selected boundary identifier is one of a plurality of boundary identifiers; displaying, on the GUI, a first menu listing the plurality of boundary identifiers; displaying, on the GUI, a second menu listing a plurality of parameters associated with an event or condition; displaying, on the GUI, an input control configured to receive a selected period of time; receiving via the GUI: a first user input identifying the selected boundary identifier from the first menu; a second user input identifying a selected parameter from the second menu; and a third user input identifying the selected period of time; in response to receiving the first, second, and third user inputs, displaying, on the GUI, a second graphical representation of the geographical area sectioned into a plurality of subareas that are defined by the selected boundary identifier and a depiction of data relating to the selected parameter within the selected period of time displayed within each sectioned subarea; wherein any one of the sectioned subareas within the second graphical representation of the geographical area is selectable; receiving, by one or more processors and via the GUI, an indication that one of the sectioned subareas has been selected; and in response to receiving the indication that one of the sectioned subareas has been selected, displaying, on the GUI, information associated with the parameters associated with the selected sectioned subarea and within the selected period of time. In one embodiment, the selected sectioned subarea is at least partially defined by a natural boundary. In one embodiment, the instructions are executed with at least one processor so that the following steps are executed: receiving, by the one or more processors and via the window, an indication that another of the plurality of subareas has been selected; and in response to receiving the selection of the another subarea, displaying, on the GUI, information regarding the factors within the another selected subarea and within the selected period of time. In one embodiment, the instructions are executed with at least one processor so that the following steps are executed: (a) receiving, by the one or more processors and via the GUI, any one or more of: a fourth user input; a fifth user input; and a sixth user input; wherein the fourth user input identifies another selected boundary identifier from the first menu; wherein the fifth user input identifies another selected parameter from the second menu; and wherein the sixth user input identifies another selected period of time; and (b) automatically updating the second graphical representation of the geographical area in accordance with input(s) received in the step (a). In one embodiment, the selected parameter is associated with a prediction of the event or the condition being present or occurring within the selected subarea; and wherein the instructions are executed with at least one processor so that the following steps are executed: displaying, on the GUI, a prediction associated with the event or the condition being present or occurring within the selected subarea. In one embodiment, the selected sectioned subarea is any one of a governmental representative district; a metropolitan area; an educational district; a county; a census tract; and a census block group. In one embodiment, the information regarding the parameters within the selected subarea and within the selected period of time comprise the number of historical events or conditions that occurred within the selected subarea. In one embodiment, the instructions are executed with at least one processor so that the following steps are executed: displaying, on the GUI, a representation of available resources to address the event or the condition as a resources layer to the selected subarea; wherein the resources layer overlays the second graphical representation of the geographical area. In one embodiment, the historical events or conditions that occurred within the selected sectioned subarea are crimes. In one embodiment, the historical events or conditions that occurred within the selected sectioned subarea are crimes against a victim having an age that is within a specific age range.

It is understood that variations may be made in the foregoing without departing from the scope of the disclosure. Furthermore, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "vertical," "horizontal," "angular," "upwards," "downwards," "side-to-side," "left-to-right," "right-to-left," "top-to-bottom," "bottom-to-top," "top," "bottom," "bottom-up," "top-down," "front-to-back," etc., are for the purpose of illustration only and do not limit the specific orientation or location of the structure described above.

The phrase "at least one of A and B" should be understood to mean "A, B, or both A and B." The phrase "one or more of the following: A, B, and C" should be understood to mean "A, B, C, A and B, B and C, A and C, or all three of A, B, and C." The phrase "one or more of A, B, and C" should be understood to mean "A, B, C, A and B, B and C, A and C, or all three of A, B, and C."

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several example embodiments have been described in detail above, the embodiments described are examples only and are not limiting, and those skilled in the art will readily appreciate that many other modifications, changes, and/or substitutions are possible in the example embodiments without materially departing from the novel teachings and advantages of the present disclosure. Accordingly, all such modifications, changes, and/or substitutions are intended to be included within the scope of this disclosure as defined in the following claims. In the claims, means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method comprising:
   receiving, from a database, data associated with a plurality of parameters associated with a geographical area, the plurality of parameters comprising:
      a first parameter associated with a first plurality of geographical locations indicating the need of a first resource; and
      a second parameter associated with a second plurality of geographical locations indicating the availability of the first resource;
      wherein the geographical area includes the first and second pluralities of geographical locations;
   receiving, via a graphical user interface ("GUI") of a computer:
      a first user input indicating a selection of a first boundary identifier;
      a second user input indicating a selection of the first parameter; and
      a third user input indicating a selection of the second parameter;
   displaying, on the GUI of the computer, a graphical representation of the geographical area sectioned into a plurality of first subareas defined by first boundaries associated with the first boundary identifier;
   receiving, via the GUI of the computer, a fourth user input indicating a selection of a first subarea of the plurality of first subareas;
   aggregating, using one or more processors, each of the first and second parameters over at least the selected first subarea of the plurality of first subareas;
   performing, using the one or more processors, a service gap analysis of the first and second parameters with respect to the selected first subarea; and
   identifying, using the one or more processors and based on the service gap analysis, a new geographical location for the first resource within the selected first subarea, the new geographical location being an area (i) within the selected first subarea and (ii) at which allocation of the first resource is deemed deficient by the service gap analysis;
   wherein a graphical representation of each of the first subareas defined by the first boundaries within the geographical area is displayed on the GUI;
   wherein each of the graphical representations of each of the first subareas is selectable;
   wherein the method further comprises displaying, in response to the receipt of the selection of the first subarea and on the GUI, information regarding the need of the first resource within the selected first subarea;
   wherein the first resource is designed to prevent an event or condition from occurring;
   wherein the information regarding the need of the first resource within the selected first subarea comprises a number of historical events or historical conditions that occurred within the selected first subarea; and
   wherein the method further comprises displaying, on the GUI, a prediction associated with the event or condition occurring within the selected first subarea, the prediction including a forecast of occurrence of the event or condition within the selected sectioned subarea, and/or one or more factors that drive occurrence of the event or condition within the selected sectioned subarea.

2. The method of claim 1, further comprising:
   receiving, via the GUI of the computer, a fifth user input indicating a selection of a second boundary identifier; and
   updating, in response to the receipt of the indication of the selection of the second boundary identifier, the graphical representation of the geographical area such that the geographical area is sectioned into a plurality of second subareas defined by second boundaries associated with the second boundary identifier.

3. The method of claim 2, further comprising:
   receiving, via the GUI of the computer, a sixth user input indicating a selection of a second subarea of the plurality of second subareas; and
   aggregating, using the one or more processors, each of the first and second parameters over at least the selected second subarea of the plurality of second subareas.

4. The method of claim 1, wherein at least one of the first subareas is at least partially defined by a natural boundary.

5. The method of claim 1, wherein the need of the first resource within at least one of the first subareas is based on data comprising census data and/or data from other source(s).

6. The method of claim 1, wherein the first parameter is a location associated with a victim of the event or condition.

7. The method of claim 6, wherein the victim of the event or condition is a patient diagnosed with a medical condition.

8. The method of claim 1, further comprising:
   receiving, via the GUI of the computer, a fifth user input indicating a selection of a second subarea of the plurality of first subareas;
   aggregating, using the one or more processors, each of the first and second parameters over at least the selected second subarea of the plurality of first subareas;

performing, using the one or more processors, a second service gap analysis of the first and second parameters with respect to the selected second subarea; and identifying, using the one or more processors and based on the second service gap analysis, a new geographical location for the first resource within the selected second subarea.

9. The method of claim 1, wherein the computer comprises the database and/or the one or more processors.

10. A method comprising:

displaying, on a graphical user interface ("GUI") of a computer, a first graphical representation of a geographical area;
  wherein the geographical area can be sectioned into a plurality of subareas defined by a selected boundary identifier;
  wherein the selected boundary identifier is one of a plurality of boundary identifiers;

displaying, on the GUI, a first menu listing the plurality of boundary identifiers;

displaying, on the GUI, a second menu listing a plurality of parameters each of which is associated with an event or condition;

receiving via the GUI that is displaying the first graphical representation of the geographical area:
  a first user input identifying the selected boundary identifier from the first menu; and
  a second user input identifying a selected parameter from the second menu; and in response to receiving the first and second user inputs, displaying, on the GUI, a second graphical representation of the geographical area sectioned into a plurality of subareas that are defined by the selected boundary identifier and a depiction of data relating to the selected parameter displayed within each sectioned subarea;

wherein any one of the sectioned subareas within the second graphical representation of the geographical area is selectable;

receiving, via the GUI, an indication that one of the sectioned subareas has been selected;

in response to receiving the indication that one of the sectioned subareas has been selected, displaying, on the GUI, a depiction of information associated with the selected parameter and associated with the selected sectioned subarea;

analyzing, using one or more processors, the information associated with the selected parameter and the selected sectioned subarea; and identifying, using the one or more processors and based on the analysis of the information, one or more factors that correlate to the event or condition associated with the selected parameter so that the identified factor(s) are based on the selected parameter and the selected boundary identifier; and assigning, using the or more processors, a relative importance to each of the one or more factors that correlate to the event or condition associated with the selected parameter(s), wherein the one or more factors and indication(s) of their relative importance are displayed on the GUI;

wherein the selected parameter is associated with a prediction of the event or condition being present or occurring within the selected sectioned subarea; and wherein the method further comprises displaying, on the GUI, the prediction associated with the event or condition being present or occurring within the selected sectioned subarea, the prediction including a forecast of occurrence of the event or condition within the selected sectioned subarea, and/or at least one of the factors that drives occurrence of the event or condition within the selected sectioned subarea.

11. The method of claim 10, wherein the selected sectioned subarea is at least partially defined by a natural boundary.

12. The method of claim 10, further comprising:

receiving, by the one or more processors and via the GUI, an indication that another of the sectioned subareas has been selected; and in response to receiving the selection of the another sectioned subarea, displaying, on the GUI, information regarding the parameters associated with the another selected sectioned subarea.

13. The method of claim 10, further comprising:

(a) receiving, by the one or more processors and via the GUI, any one or more of:
  a third user input;
  a fourth user input; and
  a fifth user input;
  wherein the third user input identifies another selected boundary identifier from the first menu;
  wherein the fourth user input identifies another selected parameter from the second menu; and
  wherein the fifth user input identifies a selected period of time; and (b) automatically updating the second graphical representation of the geographical area in accordance with input(s) received in the step (a).

14. The method of claim 10, wherein the selected sectioned subarea is any one or multiple of governmental representative districts; metropolitan areas; municipal areas; educational districts; counties; census tracts; Census Block Groups; or other geographical boundaries.

15. The method of claim 10, wherein the information regarding the parameters within the selected sectioned subarea comprise a number of historical events or conditions that occurred within the selected sectioned subarea.

16. The method of claim 15, wherein the historical events or conditions that occurred within the selected sectioned subarea are crimes.

17. The method of claim 16, wherein the crimes are crimes against a victim having an age that is within a specific age range.

18. The method of claim 10, further comprising displaying, on the GUI, a representation of available resources to address the event or the condition as a resources layer to the selected sectioned subarea; wherein the resources layer overlays the second graphical representation of the geographical area.

19. The method of claim 10, wherein the computer comprises the one or more processors.

* * * * *